US012779451B2

(12) United States Patent
Pyayt

(10) Patent No.: US 12,779,451 B2
(45) Date of Patent: Nov. 3, 2026

(54) SYSTEMS AND METHODS FOR DISPENSING LIQUIDS

(71) Applicant: UNIVERSITY OF SOUTH FLORIDA, Tampa, FL (US)

(72) Inventor: Anna Pyayt, Tampa, FL (US)

(73) Assignee: UNIVERSITY OF SOUTH FLORIDA, Tampa, FL (US)

(*) Notice: Subject to any disclaimer, the term of this patent is extended or adjusted under 35 U.S.C. 154(b) by 570 days.

(21) Appl. No.: 18/546,422

(22) PCT Filed: Feb. 15, 2022

(86) PCT No.: PCT/US2022/016414
§ 371 (c)(1),
(2) Date: Aug. 14, 2023

(87) PCT Pub. No.: WO2022/174178
PCT Pub. Date: Aug. 18, 2022

(65) Prior Publication Data

US 2024/0123441 A1 Apr. 18, 2024

Related U.S. Application Data

(60) Provisional application No. 63/149,584, filed on Feb. 15, 2021.

(51) Int. Cl.
*B01L 3/02* (2006.01)
*B01L 3/00* (2006.01)

(52) U.S. Cl.
CPC ........... *B01L 3/0231* (2013.01); *B01L 3/5085* (2013.01); *B01L 2200/025* (2013.01);
(Continued)

(58) Field of Classification Search
None
See application file for complete search history.

(56) References Cited

U.S. PATENT DOCUMENTS 3,498,342 A * 3/1970 Sanderdon ................ B01L 9/54
422/930
4,047,438 A * 9/1977 Sekine .................... B01L 3/021
422/922
(Continued)

FOREIGN PATENT DOCUMENTS

EP 0215536 A2 3/1987
WO 2022/174178 A2 8/2022

OTHER PUBLICATIONS

International Search Report of related PCT/US22/16414, mailed on Jul. 28, 2022, 4 pages.
(Continued)

*Primary Examiner* — Brian R Gordon
(74) *Attorney, Agent, or Firm* — Husch Blackwell LLP

(57) ABSTRACT

A dispensing system can include a container including multiple channels, and each channel can be capable of containing an amount of a liquid. The dispensing system can include a well plate including multiple wells, and each well can be configured to align with a respective channel of the container. The dispensing system can include a plunger including multiple protrusions, and each protrusion can be configured to be inserted into a respective channel of the container. Movement of the plunger toward the container can force each protrusion to be inserted into the respective channel of the container thereby driving liquid from the respective channel and into a respective well of the well plate.

16 Claims, 15 Drawing Sheets

(52) U.S. Cl.
CPC ..... *B01L 2200/16* (2013.01); *B01L 2300/044* (2013.01); *B01L 2300/0672* (2013.01)

(56) References Cited

U.S. PATENT DOCUMENTS 4,106,911 A * 8/1978 Marcelli ............ G01N 35/1065 141/237
4,215,092 A * 7/1980 Suovaniemi .......... B01L 3/0275 222/137
4,237,094 A * 12/1980 Suovaniemi .......... B01L 3/0231 422/927
4,276,048 A * 6/1981 Leaback .............. B01J 19/0093 422/65
4,444,062 A * 4/1984 Bennett ................. B01L 3/0217 422/923
4,478,094 A * 10/1984 Salomaa .................. G01N 1/38 422/65
4,498,510 A * 2/1985 Minshew, Jr. ........ B01L 3/0217 73/864.18
4,511,534 A * 4/1985 Bennett, Jr. ......... B01L 3/50853 422/922
4,532,805 A * 8/1985 Flesher ................... B01L 3/021 422/922
4,948,564 A * 8/1990 Root ......................... B01L 9/06 422/534
5,141,719 A * 8/1992 Fernwood .............. B01D 61/18 422/549
5,647,994 A * 7/1997 Tuunanen ............... B03C 1/288 210/695
5,915,284 A * 6/1999 Meltzer ................. B01L 3/0279 73/864.17
5,976,470 A * 11/1999 Maiefski .............. B01J 19/0046 422/65
6,116,099 A * 9/2000 Carl ........................ B01L 9/543 73/863.32
6,143,252 A * 11/2000 Haxo, Jr. ............. B01J 19/0046 506/40
6,207,463 B1 * 3/2001 Tuunanen ............... B03C 1/284 422/50
6,258,324 B1 * 7/2001 Yiu ........................... B01L 3/02 73/864.18
6,374,683 B1 * 4/2002 Hunicke-Smith ........................... G01N 35/1067 73/863.32
6,506,611 B2 * 1/2003 Bienert .............. G01N 35/1067 422/504
6,582,664 B2 * 6/2003 Bevirt ................... B01L 3/0227 73/864.32
6,589,483 B1 * 7/2003 Maeda ............... G01N 35/1065 73/863.25
6,793,891 B2 * 9/2004 Yiu .................... G01N 35/1074 73/864.11
6,805,840 B1 * 10/2004 Tajima .................. B01L 3/0231 436/526
7,135,117 B2 * 11/2006 Kane ................... B01L 3/50255 210/321.75
7,438,857 B2 * 10/2008 Massaro ................. B01L 3/022 422/65
7,592,185 B2 * 9/2009 Karg ..................... B01F 35/882 422/514
9,415,386 B2 * 8/2016 Schoeneck .............. B08B 9/023
11,181,482 B1 11/2021 Pyayt et al.
2002/0086440 A1 * 7/2002 Lehtinen ............... B01L 3/0217 436/180
2002/0131903 A1 * 9/2002 Ingenhoven ........... G01N 35/10 422/510
2003/0223910 A1 * 12/2003 Jackson, III ............ B01L 3/021 422/400
2004/0033554 A1 * 2/2004 Powers ................ G01N 35/028 422/400
2004/0141885 A1 * 7/2004 Godin ..................... B01L 3/021 422/400
2004/0231438 A1 * 11/2004 Schwartz .............. G01F 11/023 422/65
2006/0008370 A1 * 1/2006 Massaro ............... B01L 3/0217 417/415
2007/0053797 A1 * 3/2007 Muraishi ............ G01N 35/1095 422/400
2007/0134808 A1 * 6/2007 Sullivan ................. G01N 30/24 436/180
2007/0221684 A1 * 9/2007 Steinbrenner .......... B67D 99/00 222/267
2009/0277285 A1 * 11/2009 Panzer .................. B01L 3/0217 73/864.13
2010/0310426 A1 * 12/2010 Campbell ............... B01L 3/563 141/330
2011/0209564 A1 * 9/2011 Von Beichmann ....... B01L 9/00 73/864.01
2011/0268627 A1 * 11/2011 Warhurst .............. B01L 3/0237 422/511
2011/0318241 A1 * 12/2011 Danehy ................. B01L 3/0275 422/500
2012/0258026 A1 * 10/2012 Naumann ............. B01L 3/0234 422/521
2013/0068041 A1 * 3/2013 Naumann ............. B01L 3/0275 73/864.01
2013/0195733 A1 8/2013 Siemers
2013/0230860 A1 * 9/2013 Park ...................... B01L 3/0227 435/6.12
2013/0248466 A1 * 9/2013 Lehtinen ................. B01L 3/565 422/534
2014/0004020 A1 * 1/2014 Tubbs ........................ B01L 9/54 422/564
2014/0047931 A1 * 2/2014 Mettier ..................... B01L 9/54 73/863.01
2015/0210437 A1 * 7/2015 Tajima .................. B01L 3/0275 222/1
2016/0016161 A1 1/2016 Schoeneck et al.
2017/0361313 A1 * 12/2017 Yiu ........................... B01L 3/02
2018/0117584 A1 * 5/2018 Cote ..................... B01L 3/5025
2018/0149670 A1 * 5/2018 Bork ........................ G01F 13/00
2019/0291098 A1 * 9/2019 Sung .................. C12N 15/1013
2019/0314808 A1 * 10/2019 Wilmer ................. B01L 3/0275
2020/0132534 A1 * 4/2020 Luedemann .......... B01L 3/0217
2020/0330980 A1 * 10/2020 Cote ..................... B01L 3/0217
2020/0355717 A1 * 11/2020 Izume ................... B01L 3/0227
2022/0017890 A1 * 1/2022 Lee .................... C12N 15/1003

OTHER PUBLICATIONS

Written Opinion of related PCT/US22/16414, mailed on Jul. 28, 2022, 7 pages.

* cited by examiner

SYSTEMS AND METHODS FOR DISPENSING LIQUIDS

CROSS-REFERENCE TO RELATED APPLICATIONS

This application is a national stage filing of PCT application number PCT/US2022/016414, filed Feb. 15, 2022, which claims priority to U.S. Patent Application No. 63/149,584 filed Feb. 15, 2021, and entitled, "Systems and Methods for Dispending Fluids," each of which is hereby incorporated by reference in its entirety.

STATEMENT REGARDING FEDERALLY SPONSORED RESEARCH

N/A.

BACKGROUND

Biological assays continue to be important for the development of biopharmaceutical treatments (e.g., monoclonal antibodies), testing of individuals for specific pathogens, agricultural and other food based research (e.g., testing of individuals, animals, plants, etc.), for agricultural products (e.g., milk proteins), etc. For example, the enzyme-linked immunosorbent assay ("ELISA") continues to be one of the gold standards in analytical biochemistry, and will likely continue to be for the foreseeable future. However, effectively conducting an ELISA requires the technician to have a sufficient skill level (e.g., which is reasonably high) and substantial laboratory equipment. Even then ELISAs are still prone to errors, which can undesirably impact the accuracy of the collected data. Thus, it would be desirable to have improved systems and methods for dispensing fluids.

SUMMARY OF THE DISCLOSURE

Some embodiments of the disclosure provide a dispensing system. The dispensing system can include a container including multiple channels, each channel can be capable of containing an amount of a liquid. The dispensing system can include a well plate including multiple wells. Each well can be configured to align with a respective channel of the container. The dispensing system can include a plunger including multiple protrusions. Each protrusion can be configured to be inserted into a respective channel of the container. Movement of the plunger toward the container can force each protrusion to be inserted into the respective channel of the container thereby driving liquid from the respective channel and into the aligned well of the well plate.

In some embodiments, a portion of a container can be configured to be positioned between a well plate and a plunger.

In some embodiments, multiple channels can include at least one of at least 6 channels, at least 12 channels, at least 24 channels, at least 48 channels, or at least 96 channels. Multiple wells can include at least of one at least 6 wells, at least 12 wells, at least 24 wells, at least 48 wells, or at least 96 wells. Multiple protrusions can include at least one of at least 6 protrusions, at least 12 protrusions, at least 24 protrusions, at least 48 protrusions, or at least 96 protrusions.

In some embodiments, multiple channels can include an array of channels. Multiple wells can include an array of multiple wells. Multiple protrusions can include an array of multiple protrusions.

In some embodiments, each channel of multiple channels can contain substantially the same amount of liquid.

In some embodiments, each channel of multiple channels can contain a different amount of liquid.

In some embodiments, a first channel of multiple channels can contain a first amount of the liquid. A second channel of the multiple channels can contain a second amount of the liquid. The first amount of the liquid can be substantially double the second amount of the liquid, or the first amount of the liquid can be substantially triple the second amount of the liquid.

In some embodiments, a container can be a first container, multiple channels can be first multiple channels, and liquid can be a first liquid. A dispensing system can include a second container including second multiple channels. Each channel of the second multiple channels can contain an amount of a second liquid that can be different than the first liquid.

In some embodiments, liquid can include an analyte to be tested.

In some embodiments, liquid is at least one of a first sample containing an antigen to be detected, a second sample containing a first antibody that conjugates with the antigen to be detected, a third sample containing a second antibody that conjugates with the first antibody, a blocking buffer, a wash buffer; or a substrate solution that includes a substrate that catalyzes to produce light.

In some embodiments, liquid is a first sample containing an antigen to be detected. The antigen can be a SARS-CoV-2 antigen.

In some embodiments, each well can be coated using a coating buffer before liquid is driven from each channel into a respective well.

In some embodiments, a well plate can be configured to be positioned below the container.

In some embodiments, a container can include a chamber. A well plate can be configured to be inserted into the chamber to align the well plate relative to the container thereby aligning each well of the well plate with a respective channel of the container.

In some embodiments, when a well plate is inserted into a chamber, each well of the well plate aligns with two respective channels of multiple channels.

In some embodiments, each well has a volume that is less than or equal to 0.2 mL.

In some embodiments, each channel can extend entirely through the container to define a first opening in the container and an opposite second opening in the container. Each channel can be loaded with a respective amount of liquid. The liquid within each channel can be retained within the channel and can be prevented from flowing out of the channel by the surface tension of the liquid that interacts with the second opening.

In some embodiments, each channel can be loaded with a respective amount of liquid. A dispensing system can include a barrier coupled to an upper surface of a container. The barrier can extend across a first opening of a channel of the container to retain the liquid within the channel.

In some embodiments, a barrier can be a first barrier. The dispensing system can include a second barrier coupled to a lower surface of a container. The second barrier can extend across a second opening of a channel of the container to retain liquid within the channel.

In some embodiments, a first barrier and a second barrier can be breakable. A protrusion can be configured to break the first barrier and the second barrier when the protrusion is inserted into the channel.

In some embodiments, a first barrier or a second barrier can be at least one of a membrane, or an adhesive layer with a backing material.

In some embodiments, a first barrier can extend entirely across each of the channels of a container. A second barrier can extend entirely across each of the channels of the container.

In some embodiments, a dispensing system can include a spring coupled between a container and a plunger. The spring can be configured to bias the plunger to move towards the container. A dispensing system can include a lock configured to, with the spring biased, block relative movement between the plunger and the container.

In some embodiments, a lock can be a spacer that can be positioned between a lower surface of a plunger and an upper surface of a container. A plunger can contact the spacer to block movement of the plunger towards the container.

Some embodiments of the disclosure provide a dispensing system. The dispensing system can include a container including a channel that contains a liquid, and a well plate including a well. The well can be configured to align with the channel of the container. The dispensing system can include a protrusion that can be configured to be inserted into the channel of the container. The liquid can be positioned within the channel of the container without moving the plunger to draw the liquid into the channel. Movement of the plunger toward the container can advance the protrusion into the channel of the container thereby driving the liquid from the channel into the well of the well plate.

In some embodiments, a channel can be a first channel, a liquid can be a first liquid, a well can be a first well, a plunger can be a first plunger that can include a hole, and a protrusion can be a first protrusion. A dispensing system can include a second plunger having a second protrusion. A container can include a second channel and a wall that can separate the first channel from the second channel. The second channel can contain a second liquid. The second channel can be configured to align with the hole of the first plunger and the well of the well plate. Movement of a second plunger toward a container can advance the second protrusion through the hole of the first plunger and into the second channel of the container thereby driving the second liquid from the second channel into the well of the well plate.

In some embodiments, a first liquid can be different than a second liquid.

In some embodiments, a first liquid can be a biological assay reagent. A second liquid can be a second biological assay reagent.

In some embodiments, a first channel can be coaxial to a second channel with the second channel surrounding the first channel. A wall can be a coaxial wall that separates the first channel from the second channel.

In some embodiments, a first channel can be lateral to a second channel.

In some embodiments, a first channel can have substantially the same width as a second channel.

In some embodiments, a channel can be a first channel, a liquid can be a first liquid, a well can be a first well, a plunger can be a first plunger that can include a second channel containing a second liquid, and a protrusion can be a first protrusion. A dispensing system can include a second plunger having a second protrusion. Movement of the second plunger toward a container can advance the second protrusion through the hole of the first plunger and into the second channel of the first plunger thereby driving the second liquid from the second channel into the well of the well plate.

In some embodiments, a container can include a chamber positioned below a channel. A well plate can be configured to be inserted into the chamber to be supported by the chamber. When the well plate is inserted into the chamber, the well of the well plate can align with the channel of the container.

Some embodiments of the disclosure provide a method for dispensing a fluid. The method can include aligning a first protrusion of a plunger with a first channel of a container containing a first liquid, aligning a second protrusion of the plunger with a second channel of the container containing a second liquid, aligning a first well of a well plate with the first channel of the container, aligning a second well of the well plate with the second channel of the container, advancing the first protrusion into the first channel of the container to dispense the first liquid from the channel into the first well of the well plate, and advancing the second protrusion into the second channel of the container to dispense the second liquid from the second channel into the second well of the well plate.

In some embodiments, a method can include aligning a third protrusion of a second plunger with a third channel of at least one of a second container, the container, or the first plunger, the third channel including a third liquid, aligning the first well of the well plate with the third channel, and advancing the third protrusion of the second plunger into the third channel to dispense the third liquid from the third channel into the second well of the well plate.

In some embodiments, a first liquid can be different than a second liquid.

In some embodiments, a first liquid can be a biological assay reagent. A second liquid can be a second biological assay reagent.

Some embodiments of the disclosure provide a dispensing system. The dispensing system can include a container including multiple channels configured to contain a fluid, a well plate including multiple wells configured to be inserted into the container in a manner in which one well is aligned with each channel of the container, and a plunger including multiple protrusions partially inserted into the chambers of the container. Movement of the plunger toward the container can drive the fluid out from the channels of the container and into the wells of the well plate.

In some embodiments, channels of a container can be arranged in an array of rows and columns.

In some embodiments, each channel of a container can terminate in an outlet through which the fluid can be driven.

In some embodiments, a container can include a chamber into which a well plate can be inserted.

In some embodiments, wells of a well plate can be aligned with channels of a container when the well plate is fully inserted into a chamber of the container.

In some embodiments, a chamber of a container can include laterally extending flanges that support a well plate when the plate is inserted into the container.

In some embodiments, a dispensing system can include a biasing mechanism that can bias a plunger toward a container so as to be configured to automatically drive the fluid out from channels of the container.

In some embodiments, a biasing mechanism can include one or more springs that can act upon a plunger.

In some embodiments, a dispensing system can include a locking mechanism configured to prevent relative motion between a plunger and a container.

In some embodiments, a dispensing system can include a release mechanism configured to release the locking mechanism when activated by a user to enable fluid dispensing.

The foregoing and other aspects and advantages of the present disclosure will appear from the following description. In the description, reference is made to the accompanying drawings that form a part hereof, and in which there is shown by way of illustration one or more exemplary versions. These versions do not necessarily represent the full scope of the disclosure.

BRIEF DESCRIPTION OF THE DRAWINGS

The following drawings are provided to help illustrate various features of non-limiting examples of the disclosure, and are not intended to limit the scope of the disclosure or exclude alternative implementations.

DETAILED DESCRIPTION OF THE PRESENT DISCLOSURE

Figure 2:
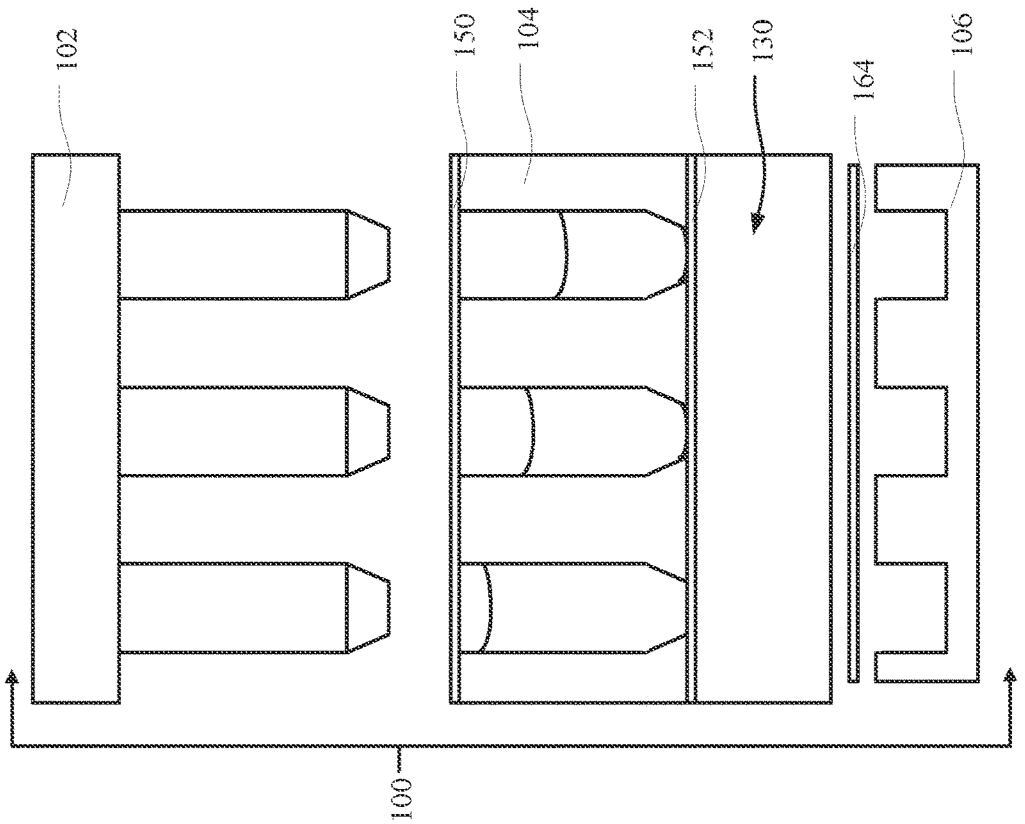
FIG. 2 shows an exploded view of the dispensing system of FIG. 1.

Effectively completing an ELISA requires a technician that has a reasonably high skill level, and laboratory equipment that can be expensive, cumbersome, and not portable. For example, this technician must be able to create a serial dilution of an analyte to be measured, ensure that the liquid within each well has been properly mixed, ensure that proper pipetting practices are adhered to (e.g., to prevent contamination between wells), etc. Thus, many individuals are precluded from conducting ELISAs due to their limited skillset. As another example, specialized laboratory equipment that is often not readily portable or available is beneficial when conducting an ELISA. This laboratory equipment can include a lab bench (e.g., to support a well plate during pipetting), pipettors, pipette tips, reagents (e.g., requiring beakers to temporarily place the reagents into), etc. Thus, samples to be analyzed are sent to a laboratory to utilize technicians skilled in completing ELISAs and to utilize the laboratory equipment.

Even when ELISAs are completed in a lab setting, errors are still prone to occur. For example, during transfer between channels (e.g., during mixing) pipette tips can still undesirably deposit liquid into a channel, which can decrease the accuracy of the ELSIA. Some conventional approaches to reduce errors involve a robotic ELISA machine that can automatically deposit the correct amounts and types of liquid into each channel of a well plate. However, while this machine can minimize issues with lab-based ELISAs, such as, for example, minimizing the inadvertent transfer of liquid between channels, these machines are expensive, cumbersome, and are not easily portable. Thus, these machines do not provide freedom to conduct ELISAs outside of a lab setting. In addition, these machines can introduce other problems. For example, while the number of individuals that can operate these machines can be increased (e.g., because these machines require a lower skill set), if these machines are not working properly, these machines can be undesirably taken down for maintenance (or repair), or require individuals within the lab to have advanced working knowledge to maintain and repair the machine. As another example, while more individuals are able to conduct an ELISA, these individuals still need to be trained to utilize the specific ELISA machine.

Some embodiments of the disclosure provide advantages that address these issues (and others) by providing improved systems and methods for dispensing fluids. For example, some embodiments of the disclosure provide a dispensing system that can increase the speed and ease of determining biochemical concentrations (e.g., antibodies specific to a pathogen). This dispensing system can be small, low-cost, and easily portable and can facilitate quick, easy, and accurate analyte concentration measurements (e.g., of antibodies in the blood of one or more individuals), unlike other lab equipment that can be bulky, cumbersome, complicated, and non-portable. The dispensing system can include a container including multiple channels that can contain premeasured volumes of liquid to be dispensed, a well plate having multiple wells, and a plunger having multiple protrusions. The well plate can be positioned relative to the container so that each channel of the container aligns with a respective well of the well plate. Correspondingly, each protrusion of the plunger can be inserted into a respective well to simultaneously dispense the liquid contained within each channel of the container into each respective well. In this way, the desired amount of liquid can be dispensed within the wells of the well plate without contamination between the wells. In some cases, after the liquid has been dispensed into the wells, the well plate can be removed from the container, and can be inserted into another container (e.g., that is similar to the container), which can contain another liquid (e.g., different from the liquid of the container). In this way, the process for the first container can be repeated for the second container to add another liquid to the wells of the well plate. In some cases, the dispensing system can include multiple containers (each of which having a corresponding plunger), with each container including a different liquid to be dispensed in the wells. In this way, each container can be used to dispense a different liquid needed for conducting the analyte analysis.

In some cases, because dispensing liquid using the dispensing system described herein can be much easier, more individuals without a specialized skill set can prepare a well plate for analyte testing (e.g., improving lab efficiency), and a well plate can even be prepared outside of a laboratory setting when using the dispensing system. For example, the dispensing system does not require typical laboratory equipment needed to prepare a well plate (e.g., for an ELSIA), such as, for example, pipettors, pipette tips, a flat surface (e.g., the dispensing system can dispense liquids without the need for resting on a flat surface), etc. Thus, the dispensing system described herein greatly expands the availability of analyte testing outside of a typical laboratory setting. In other words, the dispensing system allows for a portable laboratory. In fact, the dispensing system can be one part of a portable laboratory (e.g., a portable point-of-need testing system) that can facilitate rapid and portable analyte testing (e.g., ELISA testing), with the dispensing system being compatible with commercial regent kits, or being preloaded with the appropriate reagents. Accordingly, the dispensing system can greatly simplify the fluid manipulation workflow because all liquids (e.g., reagents) are premeasured and conveniently delivered to the wells. This can eliminate the need for time-consuming manual pipetting, reagent preparation and measurements, etc., each of which is completed by trained specialists. After the well plate is prepared, the well plate can be analyzed using a portable analysis system, such as for example, the mobile ELISA system described in U.S. patent application Ser. No. 16/121,932, which is hereby incorporated by reference into the present disclosure.

In some embodiments, the low-cost, portable ELISA testing (or other analyte testing) facilitated by the dispensing system can be used in a variety of locations and circumstances, including doctors' offices, airports/seaports, and nursing homes, such that rapid testing can be made available to the population at large. If implemented, that would improve monitoring of disease spread and enable the rapid deployment of countermeasures based on the latest and most precise test results. In addition, it may also decrease mortality during outbreaks, improve the healthcare of the general population, and support the economy by enabling immune individuals to return to work sooner.

In some embodiments, the dispensing system can be used to perform portable ELISA testing (or other analyte testing), which can be broadly applicable to biology including being applicable to the food industry (e.g., the agricultural industry), environmental science, pharmaceutical development (e.g., biopharmaceutical development, including testing of new analytes in remote regions), etc. For example, this includes monitoring health of livestock, monitoring livestock (or crop) performance, detecting pathogens in meat, milk, seafood, and other products, etc. As another example, bio-ecology scientists can perform measurements in the field and use them to make important determinations about the environment. As described above, while the dispensing system has been mainly described in the context of ELISA-based testing, it is noted that the dispensing system can, more generally, be used for fluid handling in a variety of contexts, including the measurement of cancer biomarkers, proteins indicative of heart failure, and biomarkers predictive of diabetes, as well as early detection of preeclampsia.

Figure 1:
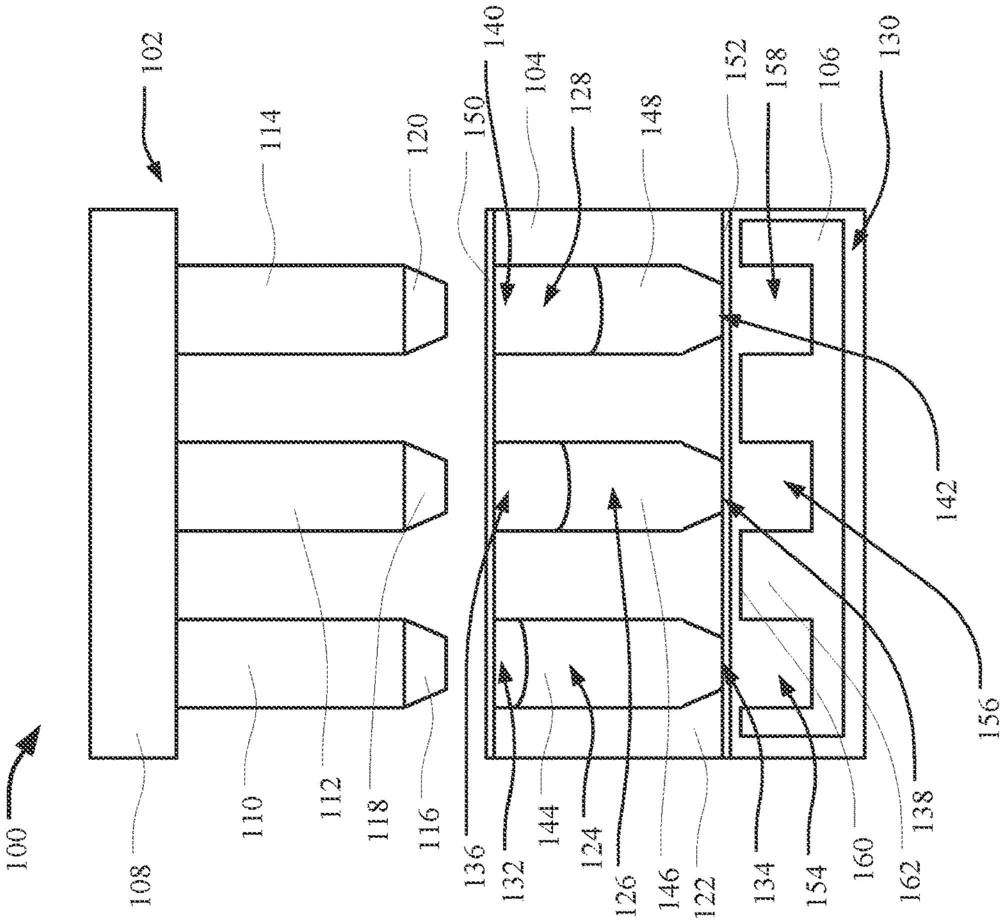
FIG. 1 shows a schematic illustration of a dispensing system.

FIG. 1 shows a schematic illustration of a dispensing system 100. The dispensing system 100 can include a plunger 102, a container 104, and a well plate 106. The plunger 102 can include a base 108, and protrusions 110, 112, 114. The protrusions 110, 112, 114 can each have a respective free end 116, 118, 120, which can be shaped in different ways. For example, as shown in FIG. 1, the free ends 116, 118, 120 each are frustoconical, however, in alternative configurations the free ends 116, 118, 120 can be shaped differently (e.g., being a prism, such as a triangular prism, etc.). In some cases, each of the free ends 116, 118, 120 can have an end surface that is substantially (i.e., deviating by less than 10 percent from) flat (e.g., the surface that is farthest away from the base 108), while in other cases, the free ends 116, 118, 120 can have and end surface that tapers to a point, an edge, etc. For example, each free end 116, 118, 120 can decrease in cross-section from a portion of the respective protrusion 110, 112, 114 to the end surface that is farthest away from the base 108. As a more specific example, each of the protrusions 110, 112, 114 can have a respective longitudinal extent that is uniform in cross-section, and the respective free ends 116, 118, 120 can each decrease in cross-section from the longitudinal extent. In some configurations, when the free ends 116, 118, 120 have a flat surface, the protrusions can ensure that all the liquid positioned in the container 104 is removed or expelled (e.g., the flat surface ensuring that no residual liquid is trapped in the container 104 between the free end of the protrusion and a channel of the container 104). In some cases, while the plunger 102 is illustrated as having three protrusions 110, 112, 114 aligned in a row, in other configurations, the plunger 102 can have other numbers of protrusions (e.g., one, two, four, etc.). In some cases, the plunger 102 can have an array of protrusions that can include a row of multiple protrusions, a column of multiple protrusions, multiple columns of multiple protrusions, multiple columns of multiple protrusions, etc. In some cases, the number of protrusions can be greater than or equal to 6 protrusions, greater than or equal to 12 protrusions, greater than or equal to 24 protrusions, greater than or equal to 48 protrusions, greater than or equal to 96 protrusions, etc., to facilitate the conducing of a biological assay (e.g., typically western blots need at least 12 wells, ELISAs need at least 96 wells, etc.).

In some embodiments, each protrusion 110, 112, 114 can be of the same design or can be different. For example, each protrusion 110, 112, 114 can have substantially the same length, or can have different lengths. In some cases, each protrusion 110, 112, 114 can have the same width, or can have different widths.

The container 104 can be positioned below the plunger 102 (e.g., a portion of the plunger 102, such as the base 108), and can include a body 122, channels 124, 126, 128, and a chamber 130. Each of the channels 124, 126, 128 can extend entirely through the container 104 (e.g., a portion of the container 104) so that the channels 124, 126, 128 are in fluid communication with the chamber 130. For example, the chamber 130 can be positioned below each of the channels 124, 126, 128, and liquid contained within the channels 124, 126, 128 can flow through the respective channel into the chamber 130. In some cases, each channel 124, 126, 128 can have a pair of openings to define the respective channel. For example, the channel 124 can have openings 132, 134, the channel 126 can have openings 136, 138, and the channel 128 can have openings 140, 142. As shown in FIG. 1, the openings 132, 136, 140 can be positioned at an upper side of the container 104, while the openings 134, 138, 142 can be positioned at a lower side of the container 104. In addition, each opening 134, 138, 142 can have a width that is smaller than a width of the openings 132, 136, 140. Correspondingly, each opening 134, 138, 142 can have a width that is smaller than a width of each of the respective wells 154, 156, 158. In this way, liquid dispensed out of the openings 134, 138, 142 can be more likely to be dispensed into each respective well 154, 156, 158, and the pressure of the liquid emitted out of the openings 134, 138, 142 can be higher to decrease spraying of the liquid that could be directed into other wells. In some cases, each opening 134, 138, 142 can define an outlet of the respective channel 124, 126, 128.

In some embodiments, each channel 124, 126, 128 can correspond in shape to a respective protrusion 110, 112, 114. For example, similarly to the protrusion 110, 112, 114, each channel 124, 126, 128 can have a respective end that corresponds in shape to the respective free end 116, 118, 120. In this way, each free end 116, 118, 120 can nest within an end of the respective channel 124, 126, 128 (e.g., which can include the respective openings 134, 138, 142), which can ensure that all of the liquid is expelled from the channels 124, 126, 128. In some cases, similarly to the protrusions 110, 112, 114, each channel 124, 126, 128 can have a longitudinal extent that is uniform in cross-section and decreases in cross-section from the longitudinal extent to, for example, define the respective openings 134, 138, 142. Thus, each channel 124, 126, 128 can have a first width (or a diameter) that is substantially the same as a width (or diameter) of a respective protrusion 110, 112, 114, and a second width (or diameter) that is substantially the same as a width (or diameter) of the respective protrusion (e.g., with the first width being smaller than the second width). Regardless of the configuration, each channel 124, 126, 128 is configured to receive a respective protrusion 110, 112, 114. For example, when the plunger 102 is advanced towards the container 104, the protrusion 110 is inserted into (and advanced through) the channel 124, the protrusion 112 is inserted into (and advanced through) the channel 126, and the protrusion 114 is inserted into (and advanced through) the channel 128. In some embodiments, the number of channels 124, 126, 128 can correspond to the number of protrusions 110, 112, 114. For example, the container 104 can include an array of channels. In addition, the number of channels can be greater than or equal to 6 channels, greater than or equal to 12 channels, greater than or equal to 24 channels, greater than or equal to 48 channels, greater than or equal to 96 channels, etc., for each set of channels that the container 104 includes. In some cases, the container 104 can include multiple sets of channels (e.g., two, three, four, etc.).

In some embodiments, each channel 124, 126, 128 can be the same or can be different. For example, each channel 124, 126, 128 can have substantially the same length, or can have different lengths. In some cases, each channel 124, 126, 128 can have the same width, or can have different widths. In some configurations, the length of each channel 124, 126, 128 can be the same as the length of each respective protrusion 110, 112, 114. In other cases, the length of each channel 124, 126, 128 can be different than the length of each respective protrusion 110, 112, 114. For example, each protrusion 110, 112, 114 can be longer than the respective channel 124, 126, 128, which can ensure that the protrusion 110, 112, 114 contacts an end of the channel 124, 126, 128 thereby ensuring that all the liquid is dispensed out of the channel. In some cases, including when each channel 124, 126, 128 does not have a smaller width than the respective protrusion 110, 112, 114, each protrusion 110, 112, 114 can extend entirely through the respective channel 124, 126, 128. In this way, each protrusion 110, 112, 114 can extend past a lower surface of the body 122 of the container 104 (e.g., into the chamber 130), which can ensure that all the liquid is dispensed out of the channels.

In some embodiments, each of the channels 124, 126, 128 can contain (and retain) an amount and type of a liquid. For example, the channel 124 can contain liquid 144, the channel 126 can contain the liquid 146, and the channel 128 can contain the liquid 148. As shown in FIG. 1, the liquids 144, 146, 148 can each be a different amount (e.g., a distinct volume), including each amount of liquid 144, 146, 148 having a substantially different amount (e.g., the amount of the liquid 144 being substantially different than the amount of the liquid 146, or the amount of the liquid 148, the amount of the liquid 146 being substantially different than the amount of the liquid 144, or the amount of the liquid 148, etc.). For example, the amount of the liquid 144 is greater than the amount of the liquid 146, and the amount of the liquid 146 is greater than the amount of the liquid 148. In other cases, however, the liquids 144, 146, 148 can have substantially the same amounts. In some cases, each of the liquids 144, 146, 148 can be the same type (or contain the same reagent, product, analyte, etc.). For example, each liquid 144, 146, 148 can include an analyte (e.g., an antigen, a protein, etc.) to be tested, a testing antibody, a blocking buffer, a wash buffer, a substrate (e.g., that catalyzes to produce light), etc. In other cases, each of the liquids 144, 146, 148 can be a different type (or contain a different reagent, product, analyte, etc.). For example, each liquid 144, 146, 148 can be a reagent, a biological assay reagent, a sample including an analyte (e.g., with each liquid 144, 146, 148 being at a different concentration of the analyte) in which case the analyte can be an antibody, an antigen, a protein, a biological compound, a compound, etc., a wash buffer, a blocking buffer, a sub state solution (e.g., that includes a sub state that catalyzes to produce light), etc. In some cases, each liquid 144, 146, 148 can include a testing antibody.

In some cases, and as described in more detail below, the liquids 144, 146, 148 can be preloaded into the respective channels 124, 126, 128 in different ways. For example, an automated pipetting system (not shown) can deposit a liquid into a respective channel, a user (e.g., a technician) can deposit the liquid into the respective channel, etc. Regardless, because the channels 124, 126, 128 can be preloaded with a liquid, this prevents the need to deposit liquid at a remote testing site (e.g., in an agricultural field), while at the same time ensuring that the channels 124, 126, 128 can be loaded with high accuracy at, for example, a lab that can include the automatic pipetting system.

In some embodiments, the container 104 can include one or more barriers 150, 152, each of which can be positioned on opposing sides of the container 104. For example, the barrier 150 can be positioned on an upper side of the container 104 (e.g., above the channels 124, 126, 128 and coupled (e.g., adhered) to an upper surface of the body 122 of the container 104), while the barrier 152 can be positioned on a lower side of the container 104 (e.g., below the channels 124, 126, 128 and coupled (e.g., adhered) to a lower surface of the body 122 of the container 104). In some cases, the barrier 150 can extend partially (or entirely) across each of the openings 132, 136, 140, while the barrier 152 can extend partially (or entirely) across each of the openings 134, 138, 142. In some cases, each barrier 150, 152 can define multiple sub-barriers, with each sub-barrier extending partially (or entirely) across an opening of a channel (e.g., the opening 132 of the channel 124).

In some cases, each of the barriers 150, 152 can be coupled to the body 122 of the container 104, while in other cases, each of the barriers 150, 152 can be removably coupled to the body 122 of the container 104. For example, the barrier 150 can be peeled away from the body 122 thereby exposing the openings 132, 136, 140, and the barrier 152 can be peeled away from the body 122 thereby exposing the openings 134, 138, 142. In some cases, each barrier 150, 152 can have a membrane and a backing layer that is coupled to and removable from the membrane. In this way, during transport of the container 104, the backing layer can ensure that the membrane is not inadvertently ruptured, thereby undesirably spilling the liquid from the container 104. However, when liquid is desired to be dispensed, the backing layer can be removed thereby exposing the membrane to the ambient environment. In this way, when the plunger 102 is advanced towards the container 104, the respective protrusions are advanced to puncture the membrane (e.g., the membrane of the barrier 150) and advanced through the channel thereby increasing the pressure and rupturing the membrane to dispense the liquid. Thus, each barrier 150, 152 can provide selective fluid communication between the channels 124, 126, 128 and the chamber 130 (or the ambient environment).

In some embodiments, including when the container 104 lacks the barrier 152, or the barrier 152 has been removed from the body 122 of the container 104, the surface tension of the liquid can contain the liquid within the channel. For example, the surface tension between the liquid 144 and the opening 134 can retain the liquid 144 within the channel 124, the surface tension between the liquid 146 and the opening 138 can retain the liquid 146 within the channel 126, and the surface tension between the liquid 148 and the opening 142 can retain the liquid 148 within the channel 128. In some cases, the surface tension can retain the liquid even when the respective protrusion is preinserted into the channel. For example, when the protrusion 110 is preinserted into the channel 124, the surface tension of the liquid 144 at the opening 134 can retain the liquid within the channel 124 (e.g., until the protrusion is 110 advanced further into the channel 124).

In some embodiments, including when the container 104 lacks the barrier 150, the plunger 102 can be preinserted into the container 104, such as, during travel of the dispensing system. For example, each protrusion 110, 112, 114 can be preinserted into the respective channel 124, 126, 128. In this way, each protrusion 110, 112, 114 can advantageously isolate the respective liquid 144, 146, 148 from the ambient environment (e.g., to avoid contamination of the liquid). In some cases, the container 104 can include a gasket (e.g., a ring gasket) that can surround a portion (or the entire) opening (e.g., the openings 132, 136, 140). In this way, each protrusion can be inserted into the respective gasket and the gaskets can provide a bolstered seal between the channels (including the liquid) and the ambient environment. In some cases, preinsertion of a protrusion can include the insertion of a free end of the protrusion into the respective channel, with the remaining portion of the protrusion exposed to the ambient environment. For example, the free end 116 of the protrusion 110 can be preinserted into the channel 124, while the remaining portion of the protrusion 110 can be positioned outside of the channel 124. This can be completed for each of the other protrusions of the plunger 102. In some cases, this can be advantageous in that the protrusions 110, 112, 114 can already be prealigned with their respective channels. In this way, the user of the dispensing system 100 does not have to algin each protrusion with each channel prior to advancing the plunger 102.

As shown in FIG. 1, the well plate 106 can be positioned below the plunger 102, and can be positioned below the container 104 (e.g., below the channels 124, 126, 128). The well plate 106 can include wells 154, 156, 158, which can align with a respective channel 124, 126, 128, and a respective protrusion 110, 112, 114. For example, the well 154 can align with the channel 124 and the protrusion 110, the well 156 can align with the channel 126 and the protrusion 112, and the well 158 can align with the channel 128 and the protrusion 114. In some cases, a width of each well 154, 156, 158 can be larger than a width of a respective channel 124, 126, 128. For example, the width of each well 154, 156, 158 can be larger than the width of the respective opening 134, 138, 142 of the respective channel 124, 126, 128. In this way, when the liquid is dispensed out of a channel, the liquid is emitted into the corresponding well and not outside of the well. In some cases, the number of wells of the well plate 106 can correspond to the number of protrusions of the plunger 102, the number of channels of the container 104 for a set of channels, etc. For example, the number of wells can be greater than or equal to 6 wells, greater than or equal to 12 wells, greater than or equal to 24 wells, greater than or equal to 48 wells, greater than or equal to 96 wells, etc.

In some embodiments, the well plate 106 can be positioned within the chamber 130, which can define an enclosed volume that is partially (or entirely) isolated from the ambient environment. For example, the container 104 can include a door (not shown) that can isolate the chamber 130 from the ambient environment, when, for example, the well plate 106 is positioned within the chamber 130. In this way, contamination from the ambient environment is less likely to negatively impact the liquid, when the liquid is dispensed into the well. In some cases, a top surface of the well plate 106 can contact the container 104, when the well plate 106 is positioned under the channels 124, 126, 128. For example, when the well plate 106 is positioned within the chamber 130 of the container 104, and when each well 154, 156, 158 is aligned with the respective channel 124, 126, 128, the upper surface of the well plate 106 can contact a surface of the container 104 (e.g., at the chamber 130). In this way, a wall can be defined between two respective adjacent wells, which can mitigate undesirable mixing of liquids between wells. For example, the upper surface 160 of the well plate 106 can contact the container 104 at the chamber 130 to define a wall 162 between the wells 154, 156. In this way, the liquid 144 is not inadvertently dispensed into the well 156, and the liquid 146 is not inadvertently dispensed into the well 154.

As shown in FIG. 1, the well plate 106 can be aligned with the container 104. For example, the well plate 106 can be inserted into the chamber 130 of the container 104, and each well 154, 156, 158 can be aligned with a respective channel 124, 126, 128. Then, each protrusion 110, 112, 114 can be inserted into a respective channel 124, 126, 128 (e.g., if plunger 102 is not preinserted into the container 104), and the plunger 102 can be moved towards the container 104 thereby advancing the protrusions 110, 112, 114 further into the respective channel 124, 126, 128 until the protrusions 110, 112, 114 contact the liquid. At this point, the plunger 102 can be advanced further towards the container 104 and the protrusions 110, 112, 114 can be advanced further into the respective channel 124, 126, 128 until pressure builds in the respective channel 124, 126, 128 until the barrier 152 ruptures, the surface tension is overcame, etc., and the liquid 144, 146, 148 is forced out of each channel 124, 126, 128 and into a respective well 154, 156, 158. The plunger 102 can be continually advanced until each protrusion 110, 112, 114 forces most (substantially all, or all) of the liquid out of the respective channel 124, 126, 128 and into the respective well 154, 156, 158. Once all (or most) of the liquid of the container 104 is deposited into the well plate 106, the well plate 106 can be removed from alignment with the container 104 (e.g., removed from the chamber 130). In some cases, the well plate 106 can then be aligned with another container (e.g., similarly to the container 104) that includes a different liquid than the liquid contained in the container 104. For example, the different liquid of the another container can be a different reagent than the liquid dispensed by the container 104.

In some cases, including after the testing has been completed (e.g., an ELISA), the spent liquid that was deposited in the wells of the well plate 106 can be directed back into the container 104 (e.g., to dispose of the dispensing system 100 in a biologically safe manner). For example, the well plate 106 can be brought back into alignment with the container 104 including aligning each well of the well plate 106 with the respective channel of the container 104. Then, the container 104 with the well plate 106 can be inverted, and the plunger 102 can be retracted so that the liquid positioned within each well of the well plate 106 can be withdrawn back through the respective channel of the container 104.

In some embodiments, the components of the dispensing system 100 can be formed out of various materials. For example, the components of the dispensing system 100 can be formed out of a polymer (e.g., a plastic) that can be disposed of after use of the dispensing system 100. As another example, the components of the dispensing system 100 can be formed out of a material that can withstand a disinfection process, such as, for example, an autoclaving process, an ethylene oxide treatment, etc. In this way, the dispensing system 100 can be advantageously reused, which can help to decrease laboratory waste including pipette tips.

FIG. 2 shows an exploded view of the dispensing system 100. As shown in FIG. 2, the plunger 102 can be positioned above the container 104, and the well plate 106 can be positioned below the container 104 (e.g., positioned below a portion of the container 104, such as the portion of the container 104 that includes the channels 124, 126, 128). In some embodiments, the well plate 106 can include a barrier 164 that can be removably coupled to the body of the well plate 106. This barrier 164 can extend partially (or entirely) across each of the wells 154, 156, 158. In this way, the barrier 164 can isolate the contents (e.g., a coating layer) positioned within each well 154, 156, 158 before the liquid is dispensed into each well 154, 156, 158. In addition, including after liquid has been dispensed into each well 154, 156, 158, the barrier 164 can be coupled to the body of the well plate 106 to isolate the wells 154, 156, 158, after a substrate has been added to each well 154, 156, 158. In some cases, the barrier 164 can be transparent or translucent to view a color change within each well 154, 156, 158.

Figure 3:
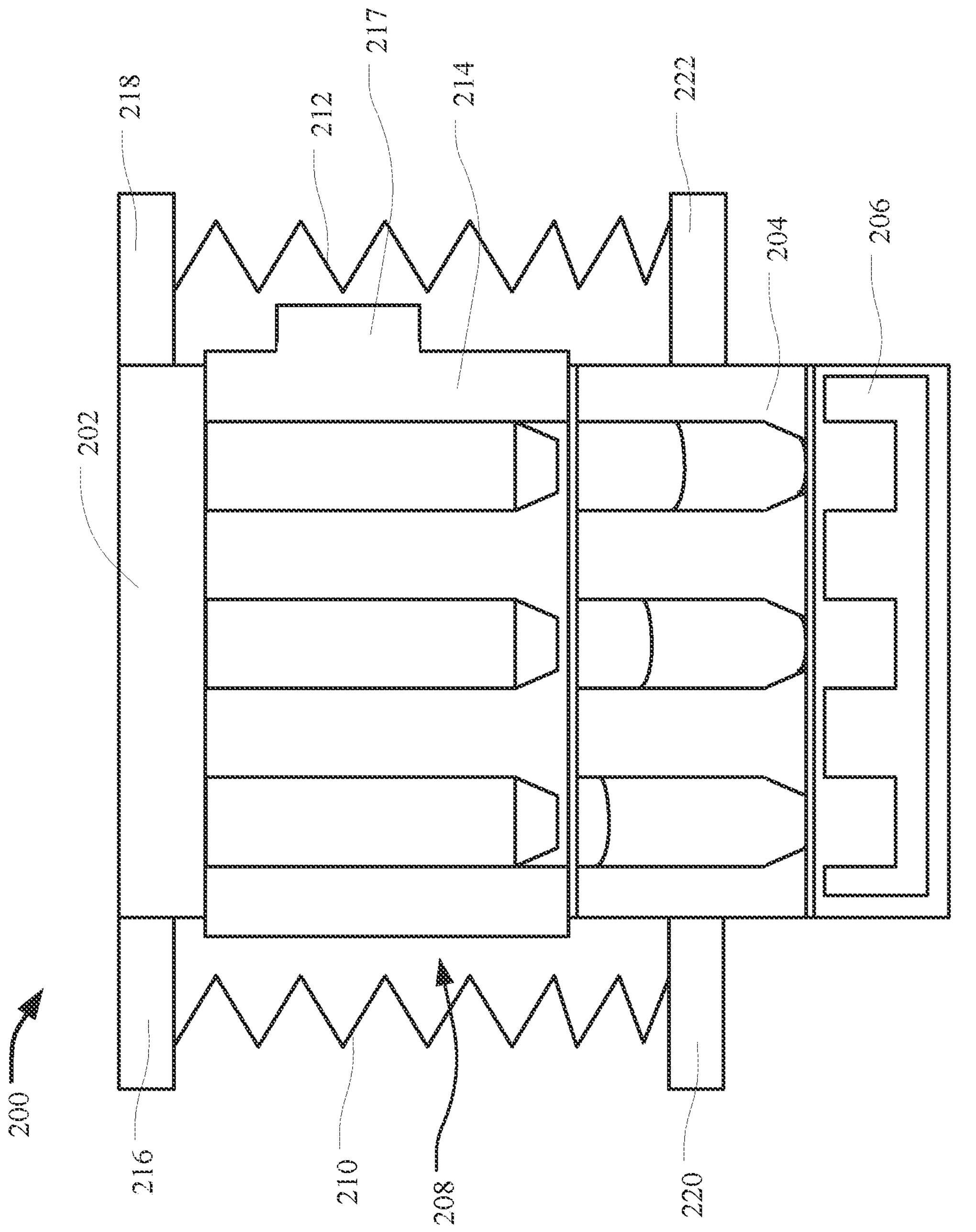
FIG. 3 shows a schematic illustration of another dispensing system.

FIG. 3 shows a schematic illustration of a dispensing system 200, which can be a specific implementation of the dispensing system 100. Thus, the dispensing system 100 pertains to the dispensing system 200 (and vice versa). The dispensing system 200 can include a plunger 202, a container 204, a well plate 206, a lock 208, and springs 210, 212. The lock 208 can block relative movement between the plunger 202 and the container 204. For example, the lock 208 can block or prevent movement of the plunger 202 towards the container 204. In some cases, the lock 208 can be implemented as a spacer 214 that can separate the plunger 202 from the container 204. For example, the spacer 214 can be positioned between the plunger 202 and the container 204, and the spacer 214 can block the plunger 202 from advancing towards the container 204 (e.g., by contacting the plunger 202 and the container 204) under the urging of the springs 210, 212 or other biasing device (e.g., elastic band). In this way, the lock 208 (e.g., the spacer 214) can advantageously prevent inadvertent advancement of the protrusions of the plunger 202 that could inadvertently dispense the liquid out of the channels of the container 204.

As shown in FIG. 3, each spring 210, 212 can be positioned on opposing sides of the plunger 202 (and the container 204), and each spring 210, 212 can be coupled between the plunger 202 and the container 204. For example, the plunger 202 can include extensions 216, 218 that can extend laterally away from the plunger 202, and the container 204 can include extensions 220, 222 that can extend laterally away from the container 204 (e.g., each extension 220, 222 can be positioned below an upper surface of the container 204). One end of the spring 210 can be coupled to the extension 216, while the other end of the spring 210 can be coupled to the extension 220. Correspondingly, one end of the spring 212 can be coupled to the extension 218, while the other end of the spring 212 can be coupled to the extension 222. While FIG. 3, shows two springs 210, 212, the dispensing system 200 can include a spring, with the plunger 202 and the container 204 being coaxially received within the spring. In other words, the spring can surround the plunger 202 and the container 204.

Figure 4:
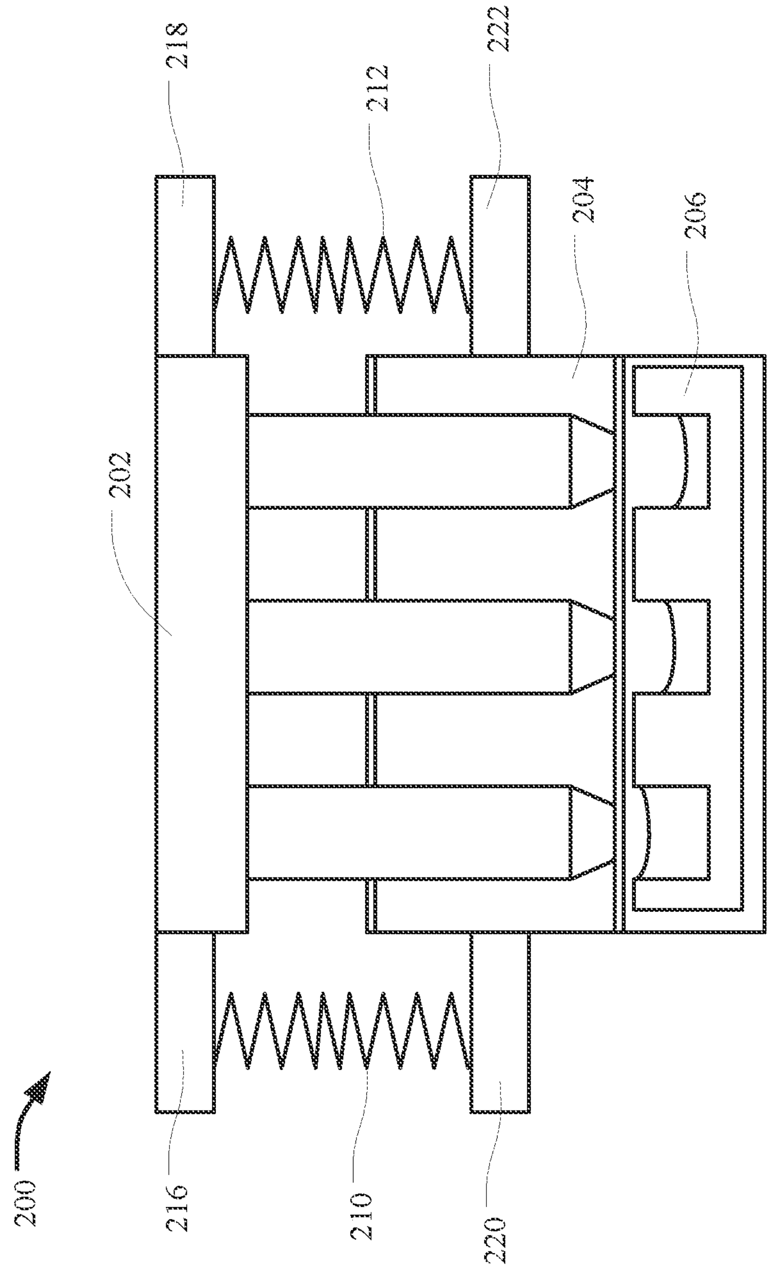
FIG. 4 shows the dispensing system of FIG. 4 with the springs unbiased and the spacer removed.

In some embodiments, when the spacer 214 is positioned between the plunger 202 and the container 204, the springs 210, 212 can be loaded to bias the plunger 202 towards the container 204, which is shown in FIG. 3. In some cases, when the spacer 214 is positioned between the plunger 202 and the container 204, at least a portion of each protrusion of the plunger 202 can be positioned outside of the respective channel of the container 204. For example, as shown in FIG. 3, each protrusion of the plunger is positioned entirely outside of the container, including being positioned entirely outside of a respective channel of the container 204. In some cases, when the liquid is desired to be dispensed from the container 204 and into the well plate 206, the spacer 214 can be removed from engagement with the plunger 202 and the container 204. For example, a handle 217 coupled to the spacer 214 can be grasped to move the spacer 214 out of alignment with the plunger 202 and the container 204. In some cases, when the spacer 214 is removed (or the lock 208 is unlocked), the springs 210, 212 unload and the plunger 202 advances towards the container 204 to dispense the liquid from each channel into a respective well of the well plate 206. FIG. 4 shows the dispensing system 200 with the springs 210, 212 unbiased and the spacer 214 removed. As shown in FIG. 4, each spring 210, 212 has pulled the plunger 202 and thus each protrusion into each corresponding channel to force the liquid to dispense within the channel into a respective well of the well plate 206. In some embodiments, the springs 210, 212 can each be an extension spring.

Figure 5:
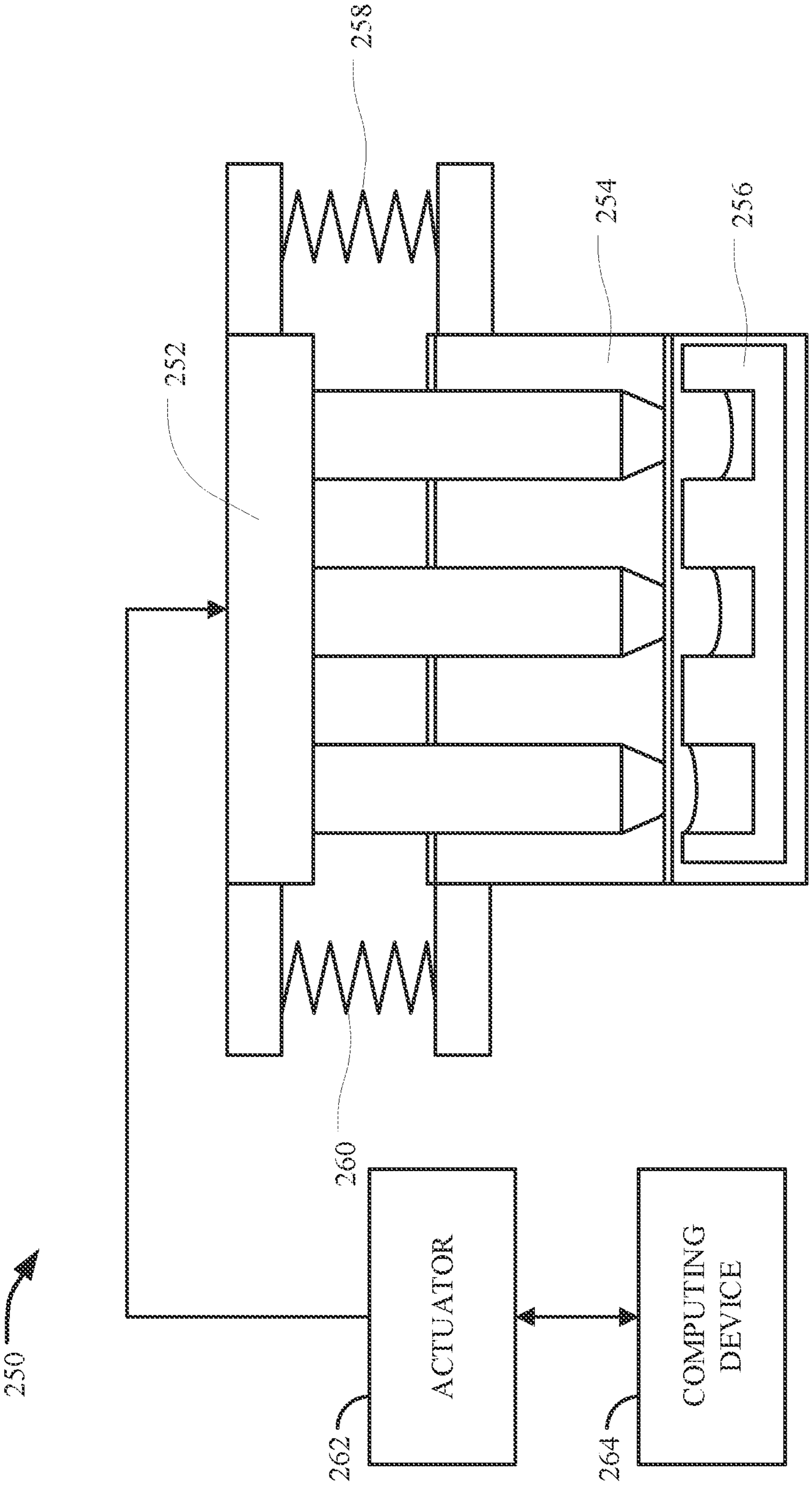
FIG. 5 shows a schematic illustration of another dispensing system.

FIG. 5 shows a schematic illustration of a dispensing system 250, which can be a specific implementation of the other dispensing systems described herein. Thus, the other dispensing systems pertain to the dispensing system 250 (and vice versa). The dispensing system 250 can include a plunger 252, a container 254, a well plate 256, springs 258, 260, an actuator 262, and a computing device 264. In some embodiments, the springs 258, 260 can bias the plunger 252 away from the container 254. For example, as the plunger 252 is forced towards the container 254 (e.g., downwardly), the springs 258, 260 are loaded. Then, when the force is removed from the plunger 252, the springs 258, 260, unload to retract the plunger 252 away from the container 254 (e.g., upwardly). Thus, in some cases, each spring 258, 260 can be a compression spring, or stated differently each spring 258, 260 can be a return spring to return the plunger 252 to a position. Similarly to the dispensing system 200, the dispensing system 250 can include a spring (e.g., rather than two springs) that is coaxial with the plunger 252, and the container 254 (e.g., the spring can surround the plunger 252 and the container 254). Other biasing devices (e.g., a compressible elastomer) can be positioned to provide the return bias, similar to that provided by the example springs 258, 260.

As shown in FIG. 5, the dispensing system 250 can include an actuator 262 and a computing device 264 in communication (e.g., bidirectional communication) with the actuator 262. The actuator 262 can be implemented in different ways. For example, the actuator 262 can be an electrical actuator (e.g., a linear actuator), a pneumatic actuator, a hydraulic actuator, etc. The computing device 264 can also be implemented in different ways. For example, the computing device 264 can be implemented as one or more processor devices of known types (e.g., microcontrollers, field-programmable gate arrays, programmable logic controllers, logic gates, etc.), including as general or special purpose computers. In addition, the computing device 264 can also include other computing components, such as memory, inputs, other output devices, etc. (not shown). In this regard, the computing device 264 can be configured to implement some or all of the steps of the processes described herein, as appropriate, which can be retrieved from memory. In some embodiments, the computing device 264 can include multiple control devices (or modules) that can be integrated into a single component or arranged as multiple separate components.

In some embodiments, the actuator 262 can be configured to move the plunger 252 towards the container 254 (e.g., by extending a portion of the actuator 262). For example, the actuator 262 can advance the plunger 252 towards the container 254, which can include advancing each protrusion of the plunger 252 into each respective channel of the container 254, thereby dispensing liquid within each respective channel into a respective well of the well plate 256. In some embodiments, using the actuator 262 can facilitate a more controlled and easier dispensing process, especially when the plunger 252 includes a large number of protrusions. For example, as the number of protrusions increases (and the width of the protrusions decreases, corresponding to decreasing widths of the channels), the greater the force required to force the plunger and each protrusion into each channel. Thus, it can be difficult for a user to depress the plunger 252 having 96 protrusions, corresponding to 96 channels of the container 254 and 96 wells of the well plate 256 needed for an ELISA. Accordingly, having an actuator 262 depress the plunger 252 address difficulty that a user may encounter when depressing the plunger 252.

Figure 6:
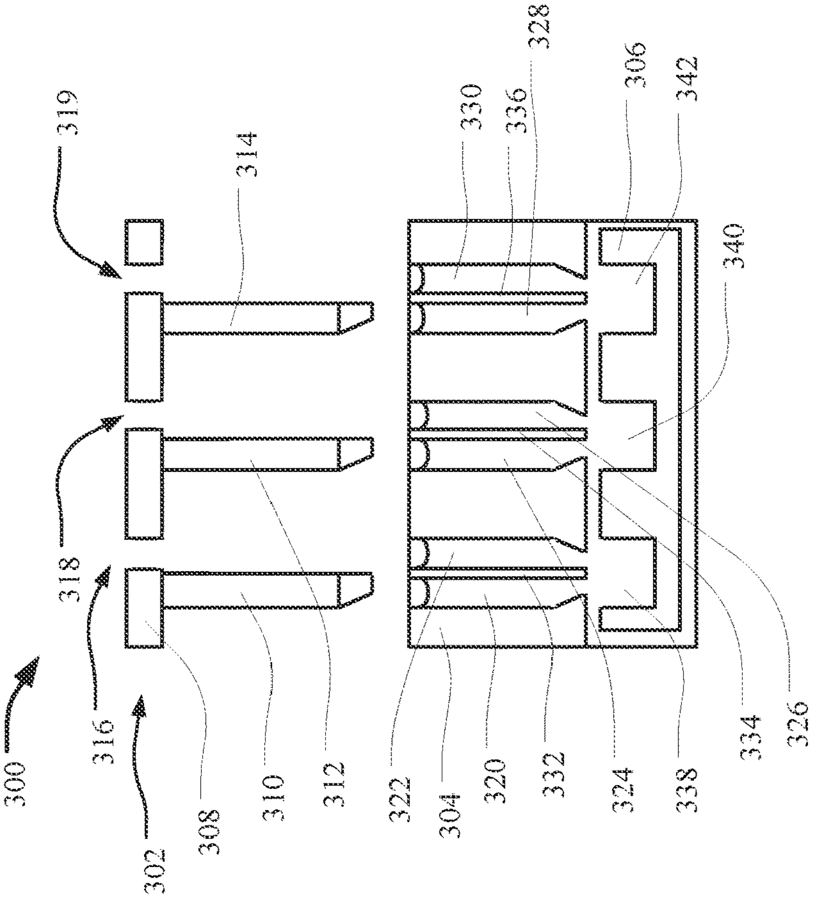
FIG. 6 shows a schematic illustration of another dispensing system.

FIG. 6 shows a schematic illustration of a dispensing system 300, which can be a specific implementation of the other dispensing systems described herein. Thus, the other dispensing systems pertain to the dispensing system 300 (and vice versa). The dispensing system 300 can include a plunger 302, a container 304, and a well plate 306. The plunger 302 can include a base 308, protrusions 310, 312, 314 coupled to and extending away from the base 308, and holes 316, 318, 319 directed through the base 308 that can be adjacent the protrusions 310, 312, 314. For example, the hole 316 can be positioned between the protrusions 310, 312, the hole 318 can be positioned between the protrusions 312, 314, and the hole 319 can be positioned on an opposite side of the protrusion 314 as the hole 318. The container 304 can include channels 320, 322, 324, 326, 328, 330, each of which can have a respective liquid positioned therein, and walls 332, 334, 336 that are positioned between pairs of channels thereby separating the channels. For example, the wall 332 can be positioned between the channels 320, 322 (e.g., thereby separating the channels 320, 322), the wall 334 can be positioned between the channels 324, 326 (e.g., thereby separating the channels 324, 326), and the wall 336 can be positioned between the channels 328, 330 (e.g., thereby separating the channels 328, 330). In some embodiments, the liquid positioned within the channels 320, 324, 328 can be the same type of liquid (e.g., a first reagent), while the liquid positioned within the channels 322, 326, 330 can be the same type of liquid (e.g., a second reagent), which can be different than the liquid positioned within the channels 320, 324, 328. In this way, different types of reagents can be added sequentially into each well so that only a single container 304 is needed to complete an analysis of an analyte (e.g., a biological assay), which can prevent the need for additional containers for each different type of reagent (e.g., so that the well plate 306 does not need to be removed, which can mitigate risk of contamination from the ambient environment or spillage).

Figure 7:
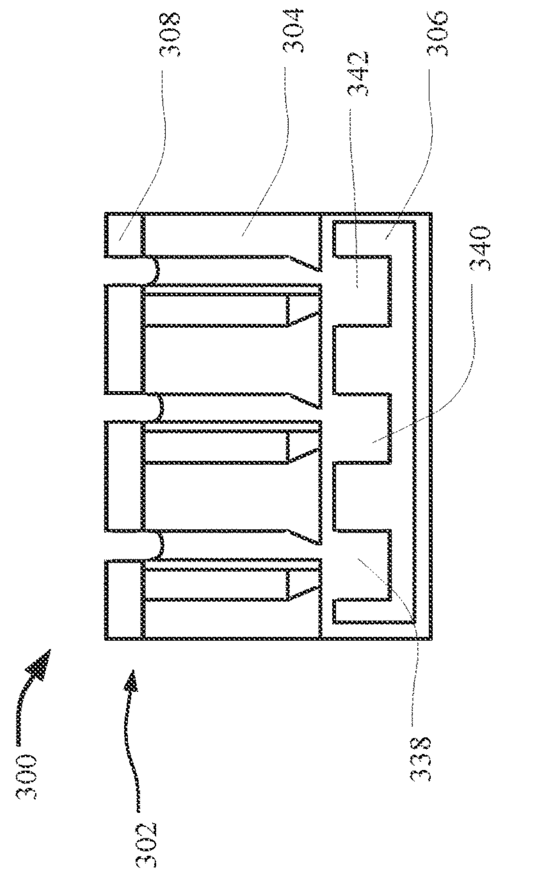
FIG. 7 shows the plunger of the dispensing system of FIG. 6 having been advanced until the liquid from the channels has been dispensed into the respective wells.

The well plate 306 can include wells 338, 340, 342. As shown in FIG. 6, each protrusion 310, 312, 314 can be aligned with a respective channel 320, 324, 328, and each hole 316, 318, 319 can be aligned with a respective channel 322, 326, 330. In addition, each well 338, 340, 342 can be aligned with the first respective channels 320, 324, 328, and the second respective channels 322, 326, 330. Then, the plunger 302 can be advanced towards the container 304 so that each protrusion 310, 312, 314 is advanced into the respective channel 320, 324, 328 to dispense the liquid from the respective channels 320, 324, 328 into the respective wells 338, 340, 342. FIG. 7 shows the plunger 302 having been advanced until the liquid from the channels 320, 324, 328 has been dispensed into the respective wells 338, 340, 342.

Figure 9:
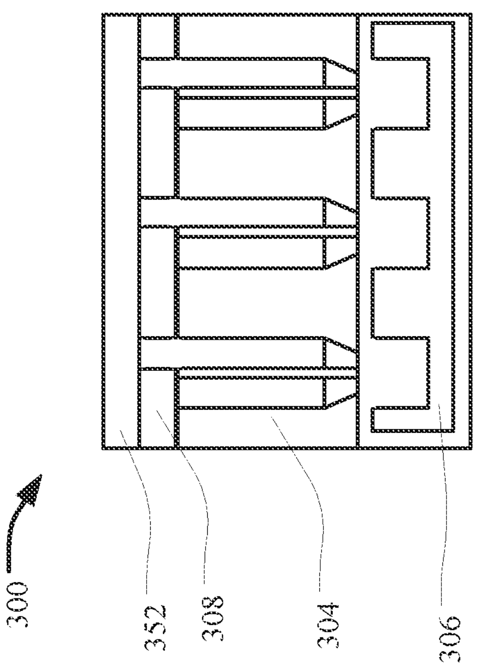
FIG. 9 shows the dispensing system of FIG. 6 with the plunger having been advanced until the liquid from the channels has been dispensed into the respective wells.
Figure 8:
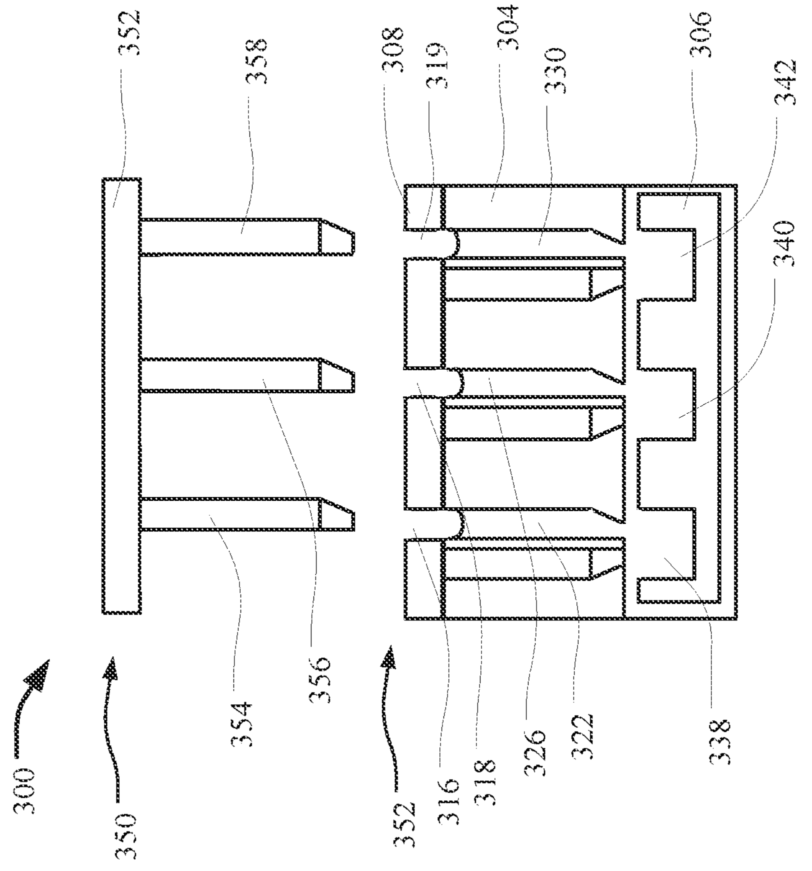
FIG. 8 shows a schematic illustration of the dispensing system of FIG. 6.

FIG. 8 shows a schematic illustration of the dispensing system 300. As shown in FIG. 8, the dispensing system 300 can include a plunger 350 having a base 352, and protrusions 354, 356, 358 coupled to and extending from the base 352. In some cases, each protrusion 354, 356, 358 can be longer than each protrusion 310, 312, 314, so that each protrusion 354, 356, 358 can be inserted fully into each respective channel 322, 326, 330. For example, the length of each channel 322, 326, 330 can be substantially the same as the length of each channel 320, 324, 328. However, the length of each protrusion 354, 356, 358 can be longer to accommodate for the thickness of the base 308 of the plunger 302. As shown in FIG. 8, each protrusion 354, 356, 358 can be aligned with a respective channel 322, 326, 330. Then, the plunger 350 can be advanced towards the container 304 so that each protrusion 354, 356, 358 is advanced through each respective hole 316, 318, 319 of the plunger 302 and into each respective channel 322, 326, 330 to dispense the liquid from the channels 322, 326, 330 into the respective well 338, 340, 342 of the well plate 306. FIG. 9 shows the dispensing system 300 with the plunger 350 having been advanced until the liquid from the channels 322, 326, 330 has been dispensed into the respective wells 338, 340, 342. In some cases, the plunger 350 can be positioned above and can contact the plunger 302 (e.g., the bases 308, 352 can contact each other, with the base 352 positioned above the base 308).

In some embodiments, while the dispensing system 300 has been described as having only two plungers (e.g., plungers 302, 350) with two adjacent channels (e.g., channels 320, 322), in other configurations, the dispensing system 300 can have other numbers of plungers (e.g., three, four, five, etc.), with the number of plungers corresponding to the number of channels within a set of channels, with each set of channels aligned with a respective well of the well plate. For example, in the case of the dispensing system having three plungers, each set of channels has three channels, with each set of channels being aligned with a respective well. Then, a first protrusion of the first plunger can be inserted into a first channel of a given set of channels, a second protrusion of the second plunger can be advanced through the first plunger and into a second channel of the given set of channels, and a third protrusion of the third plunger can be advanced through the second plunger and the first plunger and can be advanced into a third channel of the given set of channels.

In some embodiments, while adjacent channels of the container 304 of the dispensing system 300 have been described as being positioned laterally next to each other, adjacent channels can be configured in other ways. For example, for each set of channels (e.g., the set of channels being aligned with a respective well of the well plate), the individual channels of the set of channels can be coaxial to one another. For example, a first channel can be coaxial to a second channel, with the first channel surrounding the second channel, and with the first and second channels being separated by a coaxial wall. In addition, the first channel and the second channel can be aligned with a well. Correspondingly, a first hole of a first plunger can extend through a first protrusion so that the first protrusion forms a hollow tube. In this case, the first plunger is advanced so that the first protrusion is advanced into the first channel to dispense the liquid (e.g., of the first channel) into the well, and then the second plunger is advanced so that the second protrusion is advanced through the first hole of the first protrusion of the first plunger and into the second channel to dispense the liquid (e.g., of the second channel) into the well.

Figure 10:
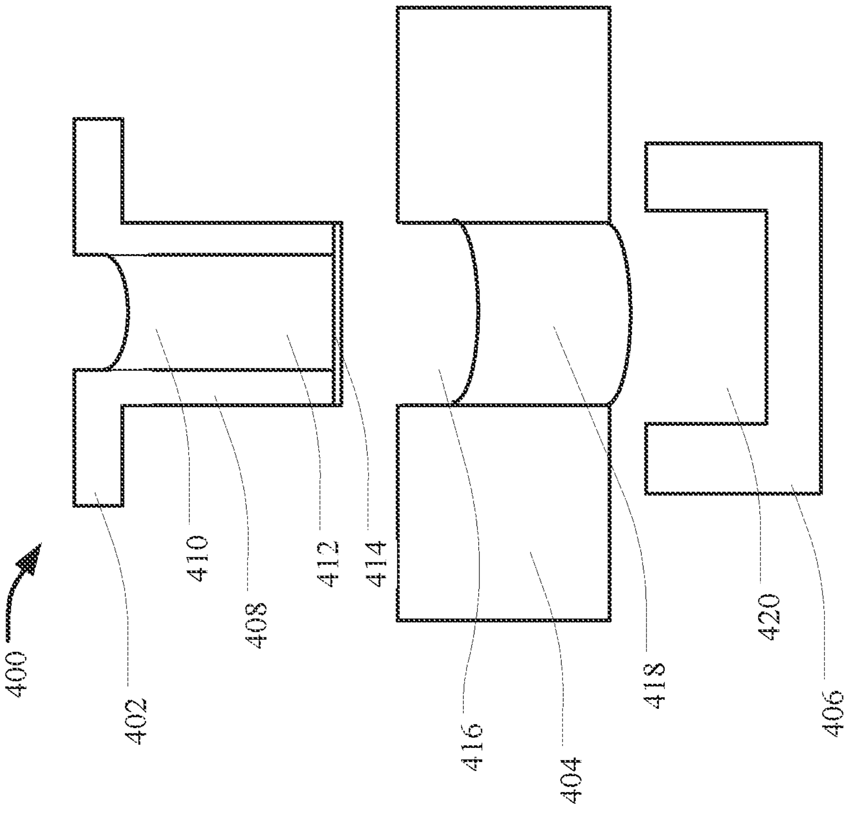
FIG. 10 shows a schematic illustration of a dispensing system.

FIG. 10 shows a schematic illustration of a dispensing system 400, which can be a specific implementation of the other dispensing systems described herein. Thus, the other dispensing systems pertain to the dispensing system 400 (and vice versa). The dispensing system 400 can include a plunger 402, a container 404, and a well plate 406. As shown in FIG. 10, the plunger 402 can be preloaded with a liquid that is to be dispensed into a well of a well plate. For example, the plunger 402 can include a protrusion 408, a channel 410 directed through the protrusion 408 that can contain a liquid 412. In some cases, the plunger 402 can include a barrier 414 that can extend across the channel 410 to contain the liquid within the channel 410. The container 404 can include a channel 416 that can contain a liquid 418, and the well plate 406 can include a well 420.

Figure 11:
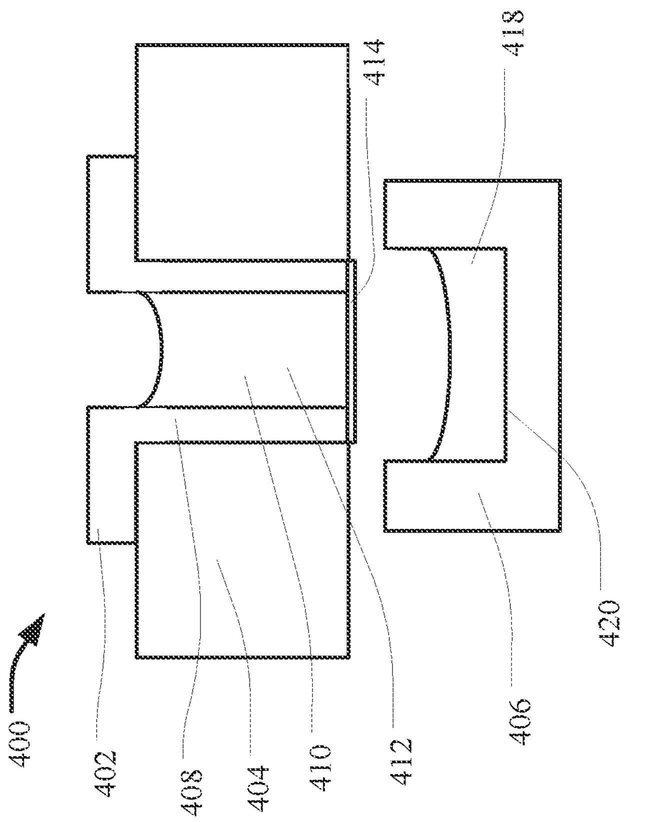
FIG. 11 shows the protrusion of the dispensing system of FIG. 10 having been advanced into the channel and the liquid having been dispensed in the well.

As shown in FIG. 10, the protrusion 408 can be aligned with the channel 416, and the channel 416 can be aligned with the well 420. Correspondingly, the channel 410 can be aligned with the channel 416, and the well 420, which occur when the protrusion 408 is aligned with the channel 416 and the well 420 (e.g., because the protrusion 408 includes the channel 410. Then, the protrusion 408 can be advanced into the channel 416 to dispense the liquid 418 into the well 420. FIG. 11 shows the protrusion 408 having been advanced into the channel 416 and the liquid 418 having been dispensed in the well 420.

Figure 13:
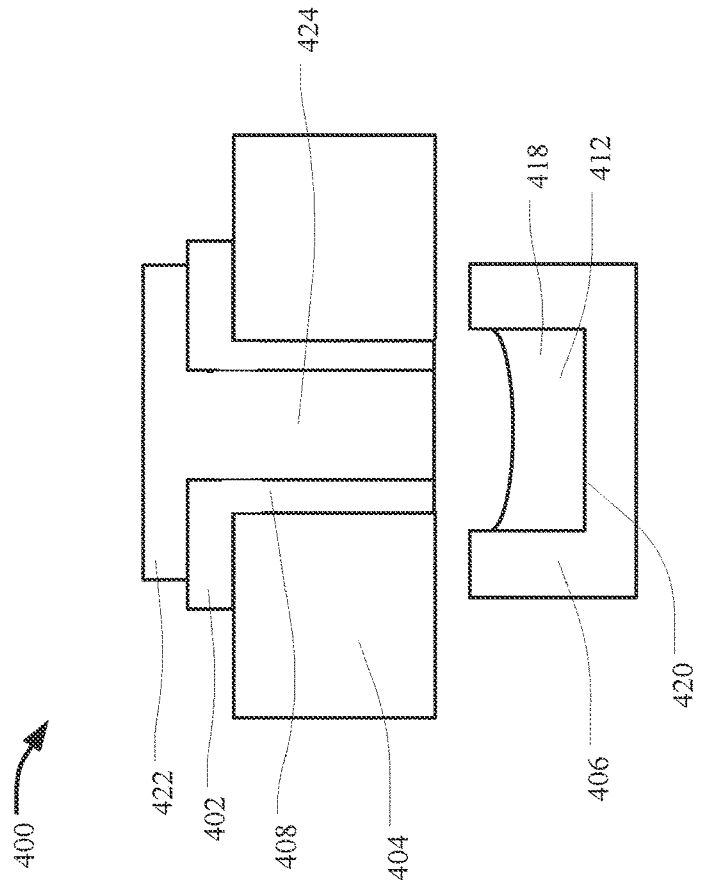
FIG. 13 shows the protrusion of the dispensing system of FIG. 10 having been advanced into the channel and the liquid having been dispensed in the well and added to the liquid.
Figure 12:
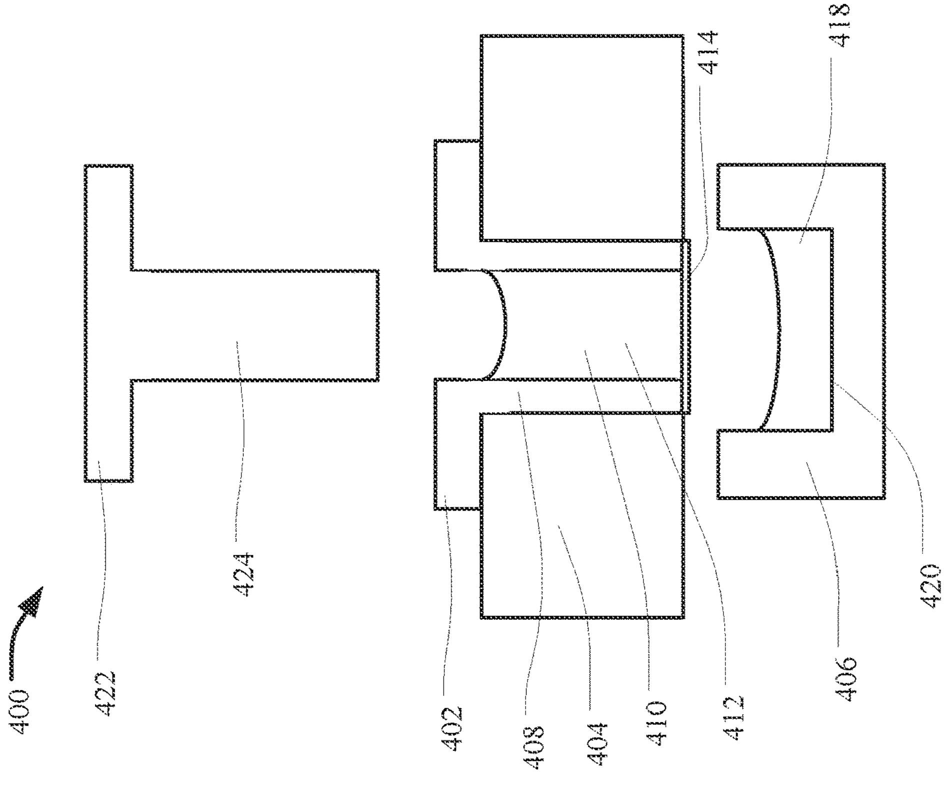
FIG. 12 shows a schematic illustration of the dispensing system of FIG. 10.

FIG. 12 shows a schematic illustration of the dispensing system 400. As shown in FIG. 12, the dispensing system 400 can include a plunger 422 having a protrusion 424. The protrusion 424 can be aligned with the channel 410, and thus can be aligned with the well 420 of the well plate 406. Then, the plunger 422 can be advanced towards the container 404, and can be advanced into the channel 410 to dispense the liquid 412 into the well 420 (e.g., to be added to the liquid 418, in which case the liquids 412, 418 can be different). In some cases, advancement of the plunger 422 can rupture the barrier 414 to release the liquid 412, or the barrier 414 can be removed prior to advancement of the plunger 422, in which case the surface tension of the liquid 412 can keep the liquid 412 in the channel 410. FIG. 13 shows the protrusion 424 having been advanced into the channel 410 and the liquid 412 having been dispensed in the well 420 and added to the liquid 418.

In some embodiments, the dispensing system can facilitate easier, quicker, etc., dispensing of liquids into wells of a well plate (e.g., dispensing liquids can require less training and/or technician skill), but the dispensing systems with multiple plungers can also be advantageous for additional reasons. For example, dispensing systems with multiple plungers and a container having multiple sets of channels, with each set of channels having multiple channels that are each aligned with a respective well can be advantageous because the dispensing system can then allow for only a specific dispensing order (e.g., because a first plunger must be engaged with the container before the second plunger) of liquids from each channel. Thus, the dispensing system can easily dispense in the correct order for analyses (e.g., biological assays) that require regents to be introduced in a specific order because the plungers can only be interfaced with the container in a specific, predefined order.

In some embodiments, a dispensing system can include additional containers that can be implemented in a similar manner as the other containers described herein. In this way, each container can have multiple channels that are filled with the same type of liquid (e.g., a reagent), which can be different between containers. For example, a first container can have multiple channels each containing a first type of liquid, and a second container can have multiple channels each containing a second type of liquid that is different than the first type of liquid. In this way, the same plunger can be used to dispense different liquids from different containers to complete an analysis on an analyte (e.g., a biological analysis).

Figure 14:
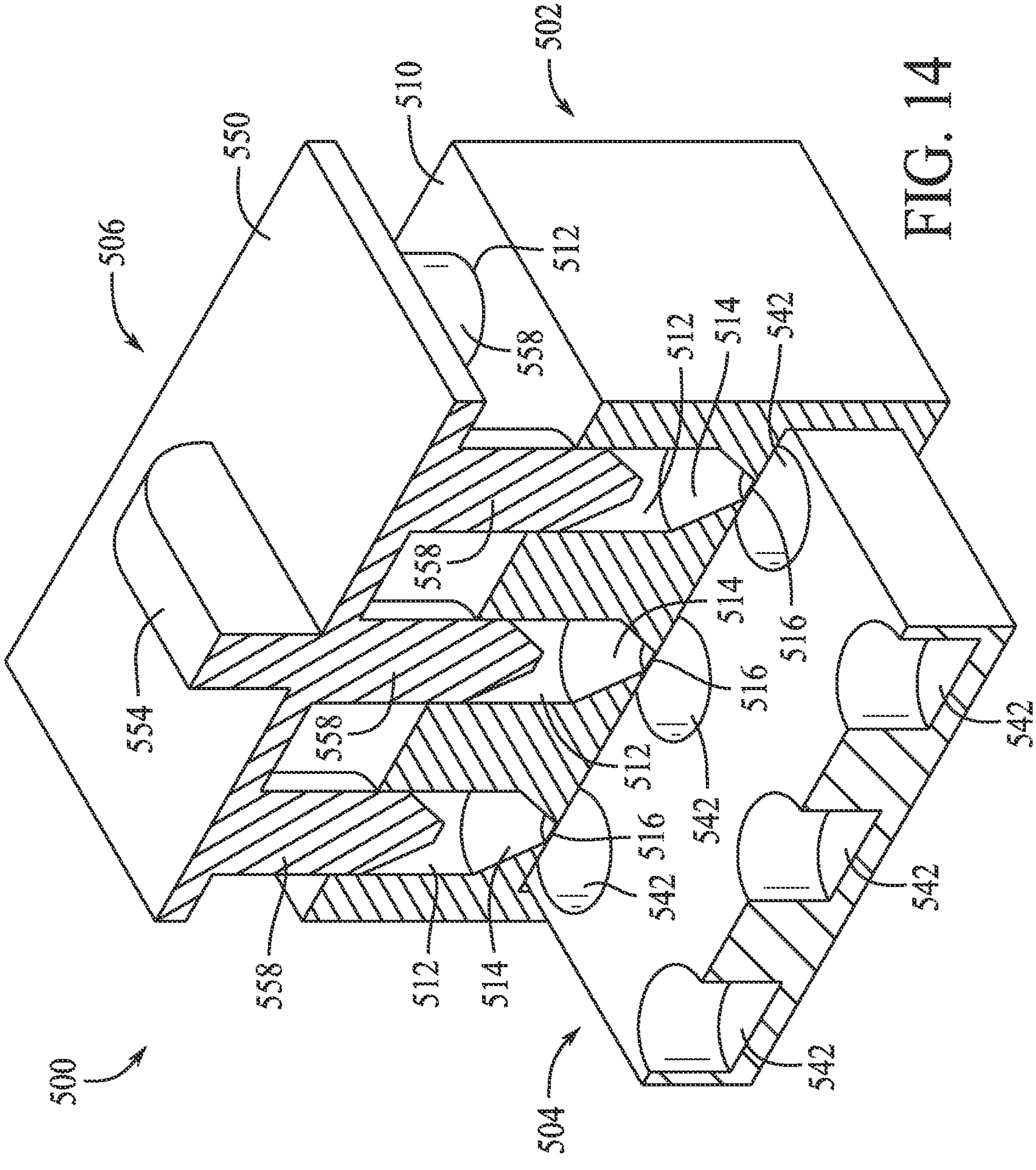
FIG. 14 shows a cross-sectional perspective view of an example embodiment of a dispensing system.

FIG. 14 shows a cross-sectional perspective view of an example embodiment of a dispensing system 500 in accordance with the above discussion. As shown in the figure, the dispensing system 500 generally comprises a container 502 that is configured to receive both a well plate 504 and a plunger 506. Each of those components is separately illustrated in FIGS. 15, 16, and 17, respectively, and will be described below.

Figure 15:
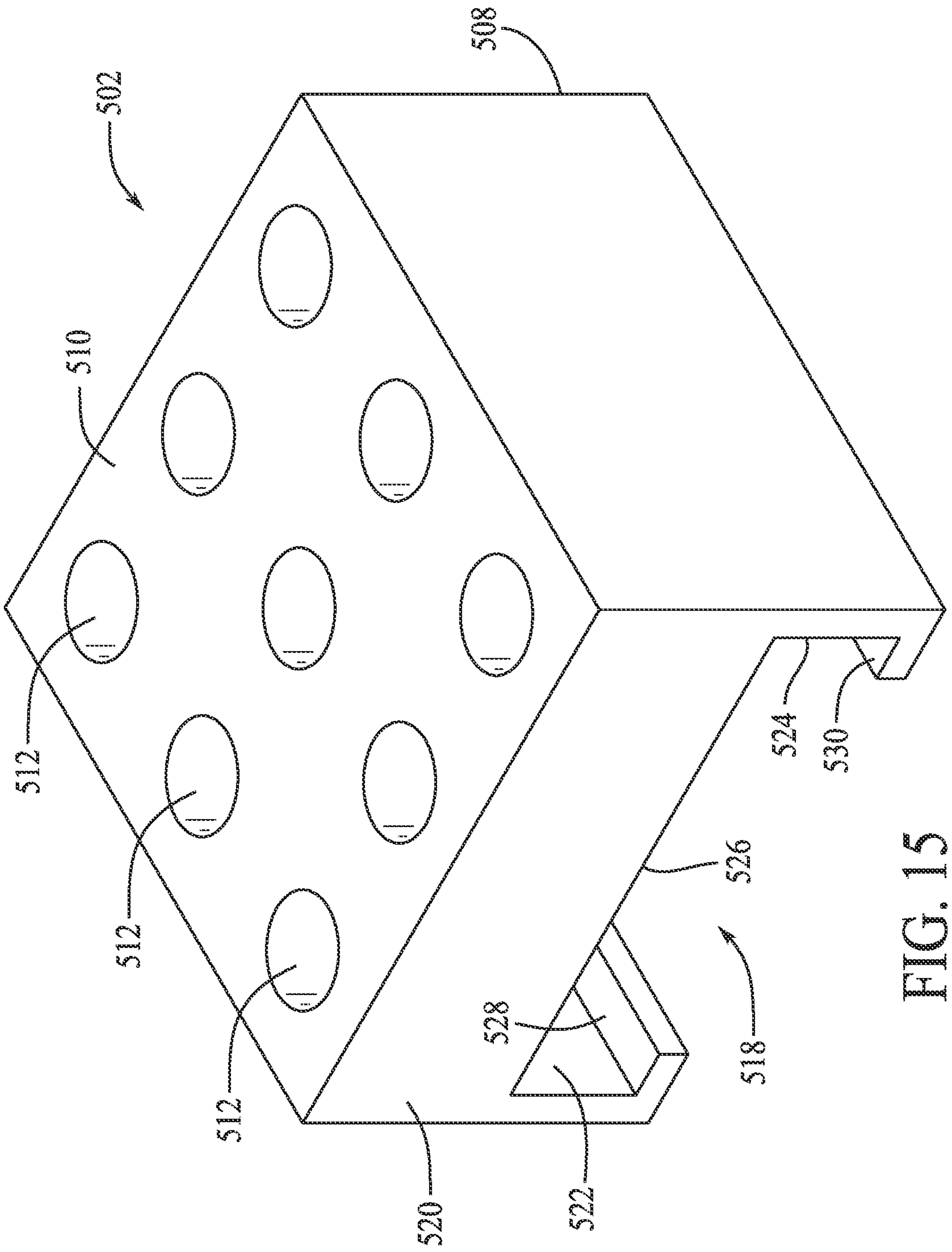
FIG. 15 shows an isometric view of a container of the dispensing system of FIG. 14.

Beginning with FIG. 15, the container 502 comprises a unitary block 508 of material, such as a polymeric material. Although the block 508 is illustrated as an orthogonal block, it is noted that the shape of the block can take on other forms. Among other things, the block 508 includes a planar top side 510 into which are formed multiple channels 512 that extend vertically downward into the block 508. In the illustrated embodiment, the block 508 includes nine such channels 512, each arranged in an array of rows and columns. Notably, a greater or lesser number of channels 512 can be provided and they need not be arranged in an array. Referring back to FIG. 14, which shows the block 508 in cross-section taken along three aligned channels 512, each channel can be cylindrical and terminate in a frustoconical cavity 514 that forms a bottom outlet 516 from which liquid can exit the channel.

The surface tension of the liquid at the outlet 516 may be great enough to prevent the liquid from exiting the channels 512 and entering the wells 542 below. However, one or more barriers (not shown) can be provided to block the outlets 516 to prevent the liquid from exiting and to prevent contamination of the liquid in the channels 512. For example, small discrete layers of material may cover the outlets 516. As another example, a single sheet of material can cover the entire inner top side 526 of the horizontal chamber 518 (described below) and, therefore, each outlet 516.

With reference back to FIG. 15, also formed through the block 508 of the container 502 is a horizontal chamber 518 that extends into the block 508 through its front side 520. In the illustrated embodiment, the chamber 518 is orthogonal and is defined by opposed inner lateral sides 522 and 524, an inner top side 526, as well as opposed lateral flanges 528, 530 that extend inwardly toward each other from the sides 522 and 524, respectively. Notably, the outlets 516 of the channels 512 extend through the top side 526 so that fluid that exits the outlets can pass into the space of the chamber 518.

Figure 16:
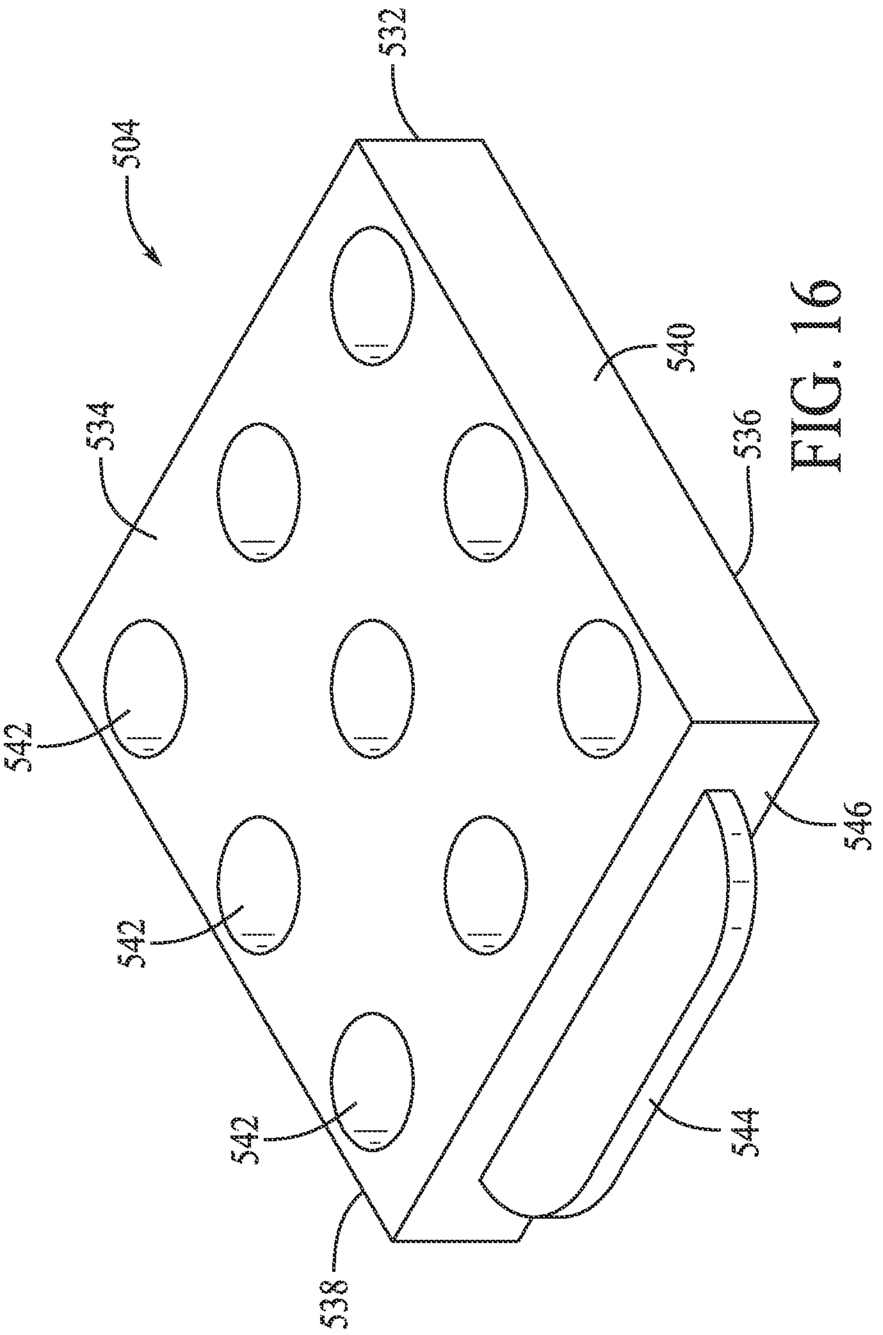
FIG. 16 shows an isometric view of a well plate of the dispensing system of FIG. 14.

Referring next to FIG. 16, the well plate 504 is also configured as an orthogonal block of material, such as a polymeric, glass, metal, or composite material, although it need not have that shape. The block 532 comprises a top side 534, a bottom side 534, and opposed lateral sides 538, 540, and is configured to be received within the horizontal chamber 518 of the container 502, as depicted in FIG. 14. With further reference to FIG. 16, formed in the top side 534 of the block 532 are multiple wells 542 that, like the channels 512, are arranged in an array of rows and columns. More particularly, the wells 542 are arranged such that one well is positioned beneath each channel 512 when the well plate 504 is correctly positioned within (e.g., fully inserted into) the horizontal chamber 518 of the container 502. In the illustrated embodiment, the well plate 504 includes nine wells 542, although a greater or lesser number of wells 542 can be provided. As is further shown in FIG. 16, a handle 544 extends from a front side 546 of the block 532 to enable a user to grip the well plate 504 when inserting the plate 504 into and removing the plate 504 out of the chamber 518.

Figure 17:
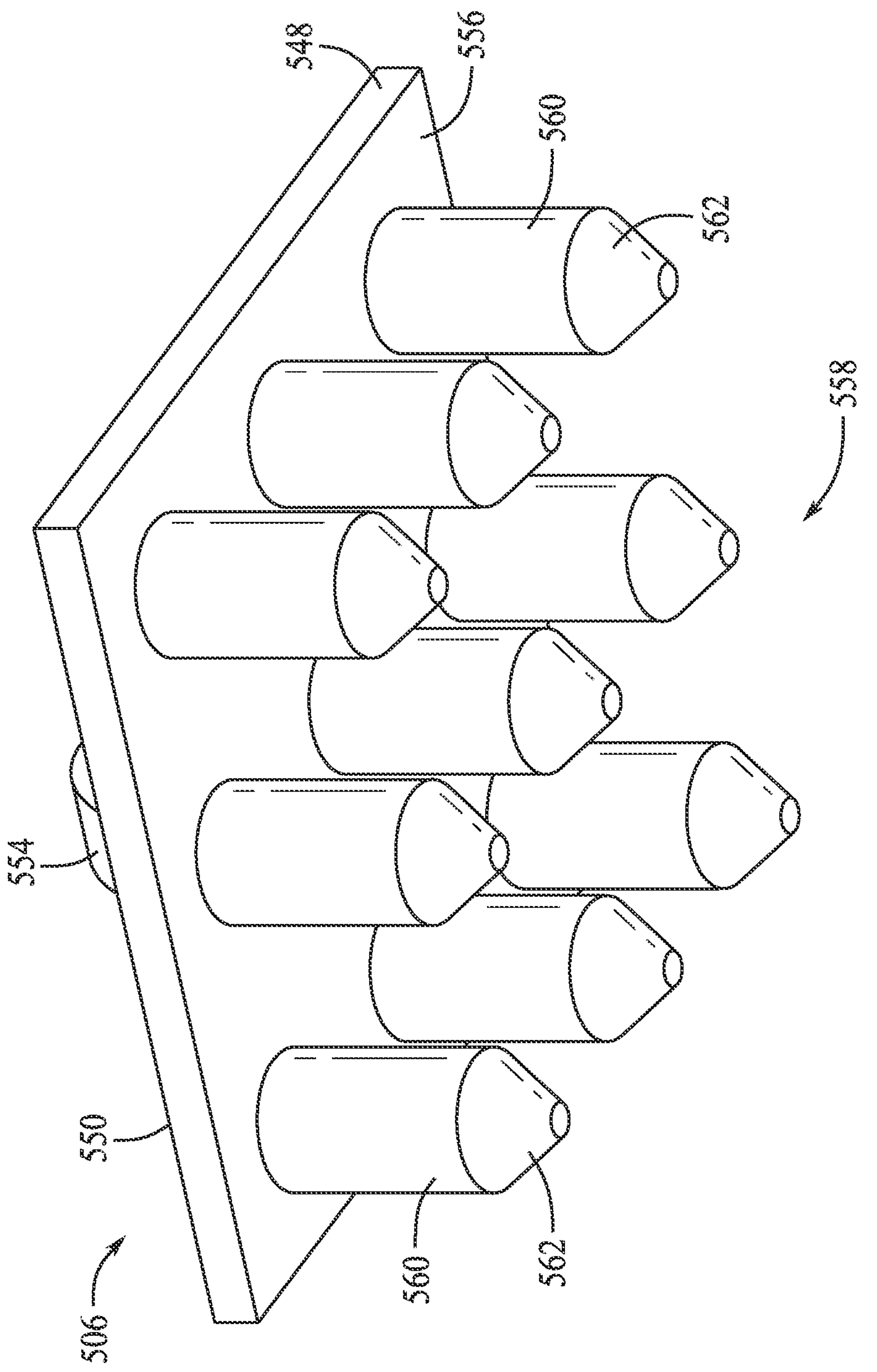
FIG. 17 shows an isometric view of a plunger of the dispensing system of FIG. 14.

With reference to FIG. 17, the plunger 506 generally comprises a plate 548 (e.g., that can be planar) including a top side 550 from which upwardly extends a handle 554, and a bottom side 556 from which downwardly extends multiple protrusions 558. In the illustrated example, each protrusion 558 includes a cylindrical body 560 that terminates in a frustoconical tip 562. The diameters of the bodies 560 are slightly smaller than the diameters of the channels 512 and the frustoconical tips 562 are slightly smaller than the frustoconical cavities 514 of the channels 512. Accordingly, each protrusion 558 is configured to be received within a channel 512 with little clearance. Like the channels 512 and the wells 542, the protrusions 558 can be arranged in an array of rows and columns. Regardless of the particular configuration, however, the protrusions 558 are arranged such that one protrusion can be received within each channel 512. In the illustrated embodiment, the plunger 506 comprises nine protrusions 558, although a greater or lesser number of protrusions can be provided.

Operation of the dispensing system 500 and interaction of the container 502, well plate 504, and plunger 506 are depicted in FIG. 14. As shown in FIG. 14, the plunger 506 is partially inserted into the container 502 from above such that one protrusion 558 is received within each channel 512 of the container 502. In some embodiments, the system 500 is provided to the end user in such a configuration with a precise volume of liquid (e.g., reagent) already provided within each channel 512. In such a case, there is no need for the end user to manually pipette liquid into the channels 512. As noted above, one or more barriers can be provided on the container 502 to prevent liquid from being accidentally dispensed and to prevent contamination.

When the user wishes to dispense the liquid from the channels 512, the user can insert the well plate 504 into the horizontal chamber 518 of the container 502 as shown in FIG. 14 so that each well 542 is aligned with (e.g., and positioned beneath) an outlet 516 of the container 502. As is apparent from that figure, the flanges 528, 530 of the chamber 518 vertically support the well plate 504. In some embodiments, the chamber 518 terminates in an inner end wall (not shown) that limits insertion of the well plate 504 and, thereby, automatically ensures correct alignment between the wells 542 and the channels 512.

The fluid within the channels 512 can be simultaneously dispensed into the wells 542 of the well plate 504 using the plunger 506. For example, the plunger 506 can be pressed downward toward the container 502 to further insert the protrusions 558 through the channels 512 and drive the liquid from the channels and into the wells 542. In embodiments in which one or more barriers are provided that prevent liquid from accidentally exiting the channels 512, the barrier(s) can either be broken when the plunger 506 is pressed downward (due to increased pressure) or can be manually removed from the container 502 before such pressing. In either case, once the frustoconical tips 562 of the protrusions 558 contact the surfaces that define the frustoconical cavities 514 of the channels 512, substantially all of the fluid within each channel 512 is dispensed into a well 542 of the well plate 504.

At that point, the well plate 504 can be removed from the container 502. If other fluids are to be added to the wells 542, the well plate can be inserted into another container (already equipped with a plunger and containing fluid) having a similar horizontal channel configured to receive the plate. The pre-inserted plunger can then be pressed toward the container as described above to dispense a second fluid into the wells 542. This process can be repeated as many times as the number of fluids that are to be added to the wells 542. In embodiments in which multiple container/fluid driver units are provided to enable addition of multiple fluids into the wells, each container can have some form of visual indication of the fluid it contains. For example, each container can have descriptive label or code, or can itself be color coded.

With such operation, the ELISA protocol can be greatly simplified as all of the fluids can be handled in a simplified way. For example, the protocol for COVID-19 antibody measurements requires 80 min of incubation and the following fluid dispensing steps followed by washing: (1) 100 μl patient samples and controls are incubated for 30 min and washed, (2) 100 μl HRP-labeled COVID-19 tracer antibody is added, incubated for 30 min and washed, (3) 100 μl of substrate incubated for 20 min, 4) 100 μl of stop solution is added, and then absorbance is measured using a plate reader.

While the washing step is simple and can be done in a minute or two, manual pipetting of reagents is very time consuming. Therefore, the process is greatly simplified and can be performed much more quickly using the dispensing system. Because of that simplification, all of the necessary fluid dispensing can be performed by a person with little to no laboratory experience or training.

Although the plunger has been described as being manually pushed toward and into its associated container to dispense the fluid contained in the container's channels, it is noted that this process can be at least partially automated, as generally discussed in connection with FIGS. 3-5. For example, the plunger can be biased downward toward its container using a biasing mechanism that includes one or more springs. Prior to dispensing, the plunger can be retained in an initial position with a locking mechanism that prevents relative motion between the plunger and the container (and between the protrusions and their channels). A release mechanism that can be, for example, activated using a release button provided on the container that, when activated (e.g., pressed) by the user, releases the locking mechanism so that the protrusions are driven through the channels by the biasing mechanism and, therefore, the fluid is driven out from the channels and into the wells of the well plate received by the container.

Figure 18:
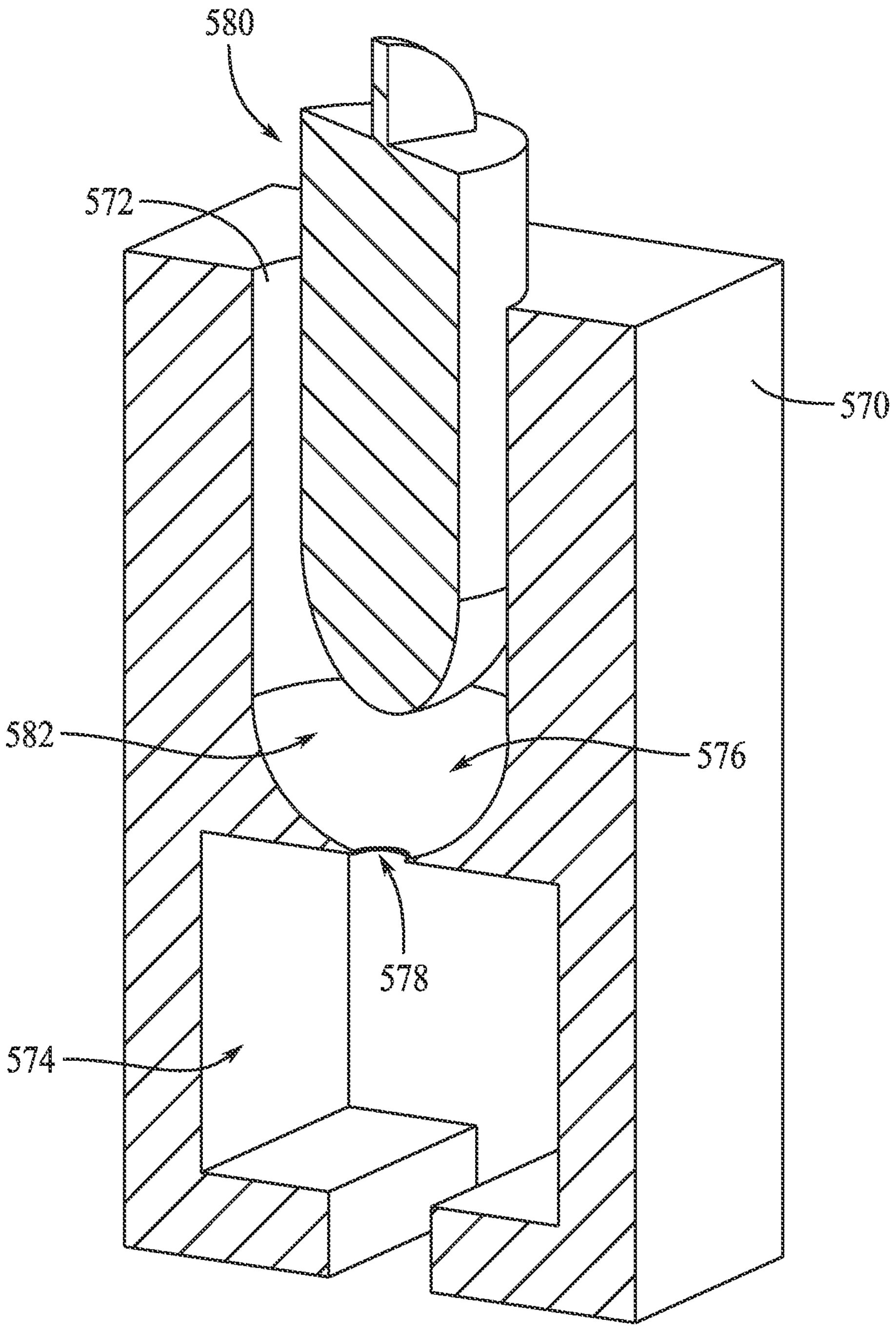
FIG. 18 shows a portion of a container having a single channel that is positioned above a chamber.

While particular configurations for the channels of the container and the protrusions of the plunger are illustrated in FIGS. 14-17, it is noted that other configurations can be used. For example, FIG. 18 shows a portion of a container 570 having a single channel 572 that is positioned above a chamber 574. As shown in the FIG. 18, the channel 572 terminates in a semispherical cavity 576 that includes an outlet 578. Received in the channel 572 is a protrusion 580 that terminates in a semispherical tip 582.

Figure 19:
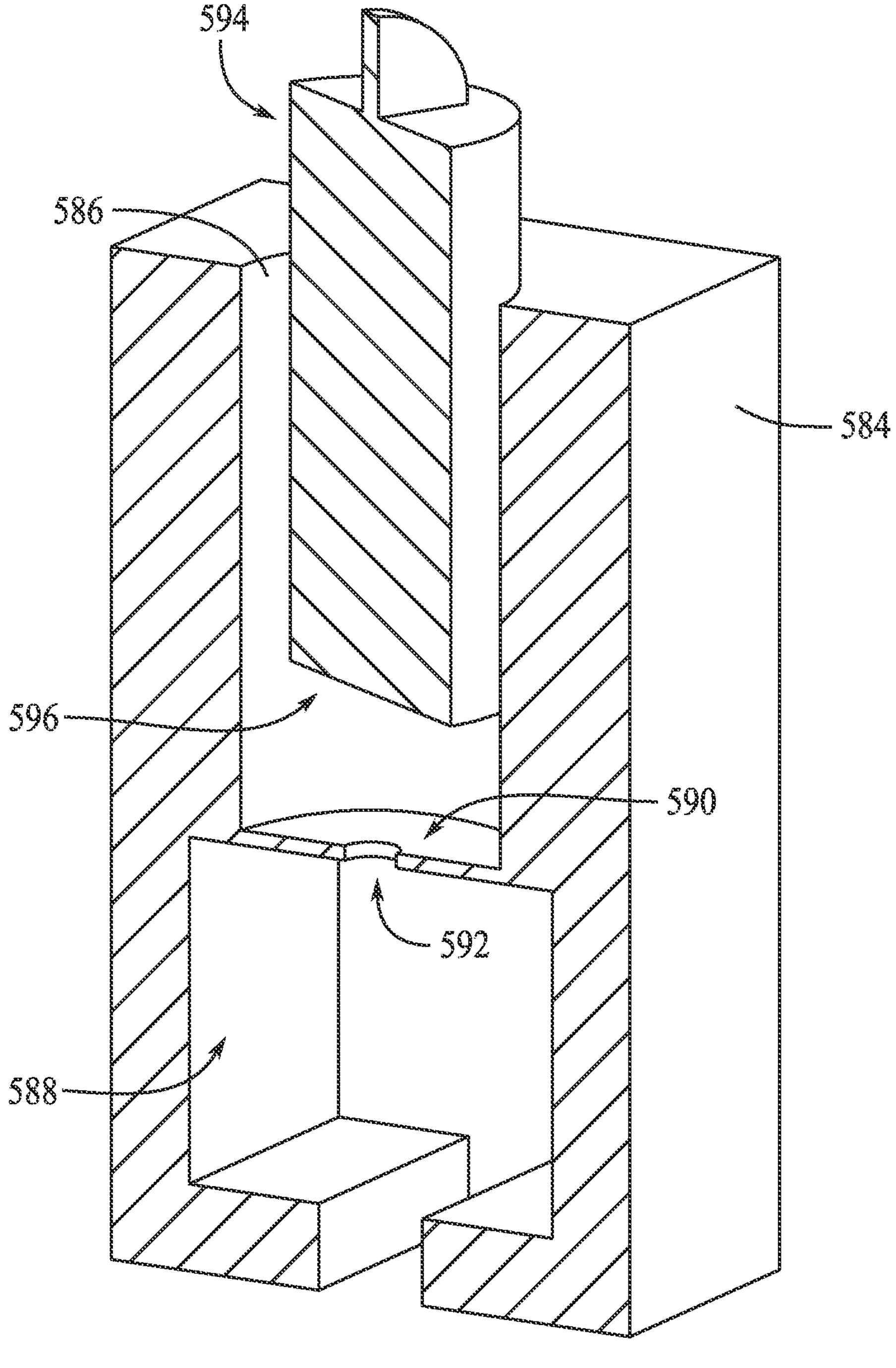
FIG. 19 shows a container includes a single channel that is positioned above a chamber.

Another example is illustrated in FIG. 19. In this example, a container 584 includes a single channel 586 that is positioned above a chamber 588. As shown in the FIG. 19, the channel 586 terminates in a planar wall 590 that includes an outlet 592. Received in the channel 586 is a protrusion 594 that terminates in a substantially flat tip 596. In other words, a free end of the protrusion 594 can have a substantially planar surface. In some cases, this flat surface of the protrusion 594 can ensure that all of the liquid (or more of the liquid) vacates the channel 586 (e.g., because it is less likely that the liquid will be trapped between the planar wall 590 and the flat tip 596, when, for example, the flat tip 596 contacts the planar wall 590.

It is noted that, in some embodiments, the container can be used to collect used liquids (e.g., reagents) from the wells of the well plate. When the container has a sealed design that prevents spilling, a well plate that had been used to conduct one or more tests can be inserted into the chamber of the container and the container can be inverted so that the fluids of each well can be received within the channels of the container. In some embodiments, this process can be facilitated with the protrusions of the plunger, which can be moved away from the container to draw the fluids into the channels. In such cases, the dispensing system also functions as a fluid disposal system.

Figure 20:
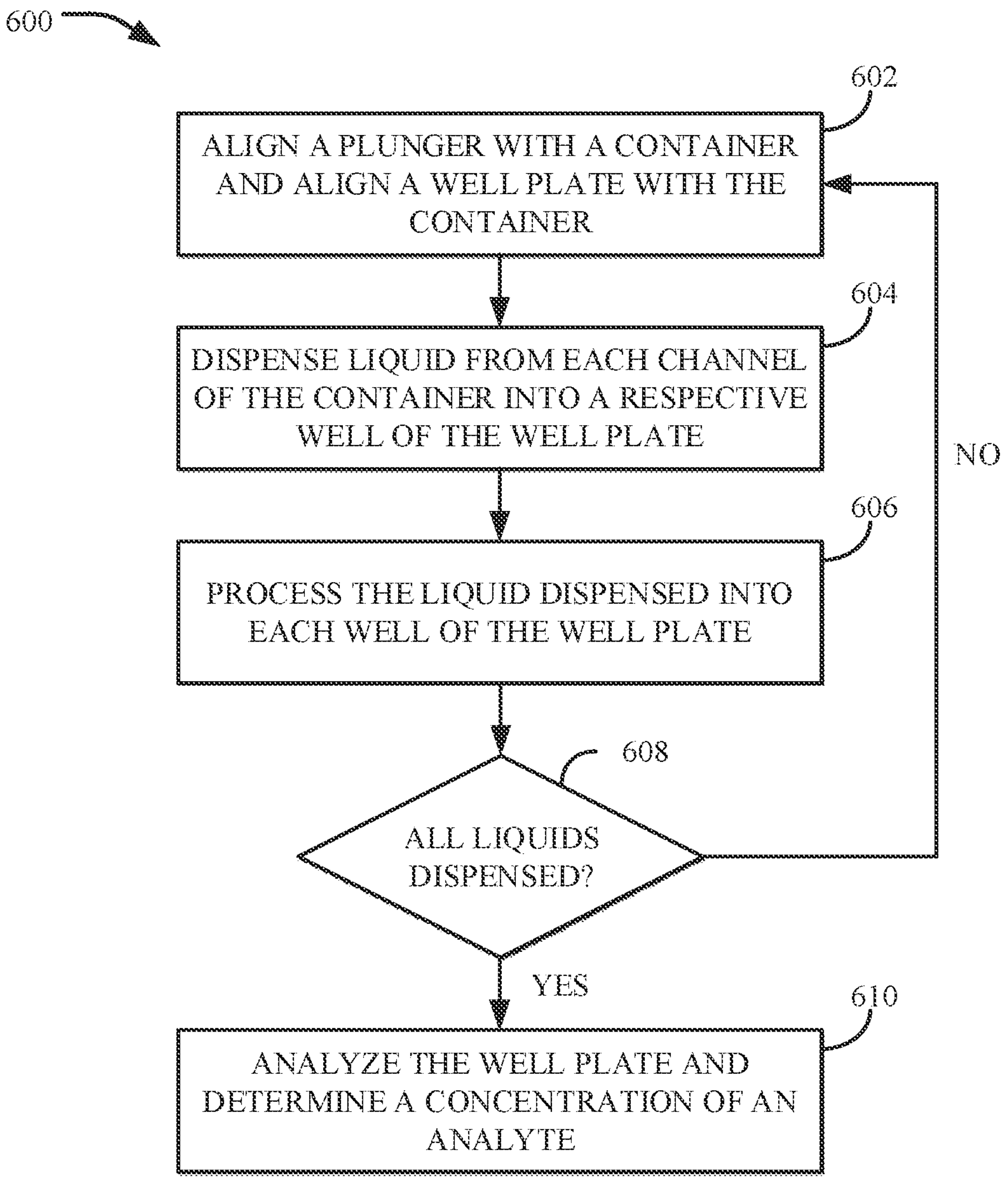
FIG. 20 shows a flowchart of a process for dispensing a fluid.

FIG. 20 shows a flowchart of a process 600 for dispensing a fluid (e.g., a liquid, such as a reagent), which can be implemented using any of the dispensing systems described herein. In some cases, some or all of the blocks of the process 600 can be implemented using one or more computing devices, as appropriate.

At 602, the process 600 can include aligning a plunger with a container, and can include aligning a well plate with the container. In some cases, the container can be preloaded with one or more types of liquid. In these cases, this can include removing a barrier from the container before aligning the plunger with the container. In other cases, including before the block 602, the process 600 can include loading a first liquid into each channel of a first set of channels of the container, loading a second liquid into each channel of a second set of channels of the container, loading a third liquid into each channel of a third set of channels of the container, etc., with the first liquid, the second liquid, and third liquid each being a different type of liquid (or the same type of liquid). In some cases, the block 602 can include aligning each protrusion of the plunger with each channel of the container (e.g., of a set of channels of the container), and advancing each protrusion into each channel (e.g., without each protrusion contacting the liquid within each channel). In some cases, the block 602 can include aligning each well of the well plate with each channel of the container (e.g., of the set of channels of the container). In some cases, this can include aligning each well with multiple channels of the container (e.g., with each channel belonging to a different set of channels of the container). For example, this can include positioning a well plate into a chamber of the container, and positioning the well plate below a portion of the container (e.g., that includes the channels of the container), and below the plunger.

In some cases, portions of the block 602 can be omitted, if for example, the plunger is already preinserted into the container. For example, each protrusion of the plunger can be preinserted into each channel of the container, and thus each protrusion of the plunger is preemptively aligned with each channel of the container.

At 604, the process 600 can include dispensing liquid from each channel of the container into a respective well of the well plate. In some cases, this can include advancing each protrusion further into each respective channel of the container to dispense the liquid in each respective channel into the respective well of the well plate. In some cases, this can include contacting a wall of the container with a free end of each protrusion, or advancing each protrusion through each channel of the container, so that a free end of each protrusion extends out of each channel of the container. In some cases, this can include a computing device advancing the plunger towards the container to dispense the liquid.

At 606, the process 600 can include processing the liquid dispensed into each well of the well plate. For example, this can include removing the well plate from alignment with the container (e.g., including removing the each well out of alignment with each channel). In some cases, processing the liquid can include incubating the well plate (and the liquid dispensed therein), mixing the liquid of the well plate (e.g., by moving the well plate, such as, by placing the well plate on a mixer, a shaker, etc.), etc.

At 608, the process 600 can determine whether or not all liquid have been dispensed into the wells of the well plate (e.g., not all the desired types of liquids have been dispensed). If at 608, the process 600 determines that not all liquids have been dispensed, the process can proceed back to the block 602. For example, this can include implementing the blocks 602, 604, 606 again. In some cases, while the well plate can be the same, the container at the repeated block 602 can be another container with channels filled with liquid different than the liquid in the container. In this case, the plunger previously used can be used again, or another plunger can be used with the another container. In other cases, the container at the repeated block 602 can be the same container, and the second set of channels containing liquid to be dispensed into the wells of the well plate can be of the plunger or the container. In this case, a second plunger can be used, according to the blocks 602, 604 to dispense the liquid within the second set of channels into the wells of the well plate. In some cases, this can include dispensing different types of liquids (e.g., different types of reagents), from different channels into the same well of the well plate. Thus, this can include mixing different liquids into the same well of the well plate (e.g., when both are dispensed in the same well).

If at the block 608, the process 600 determines that all liquids have been dispensed, the process 600 can proceed to the block 610. At the block 610, the process 600 can include analyzing the well plate and determining a concentration of an analyte contained in the well plate. In some cases, one type of fluid dispensed into each well of the well plate can include an analyte, which can be biological (e.g., an antibody, an antigen, etc.). And because the analyte in a sample can be diluted, the concentration of the analyte in the sample can then be determined. In some cases, this can include removing the well plate from a container and placing the well plate into a plate reader (e.g., which can be in communication with the computing device), which can be a microplate reader. The plate reader can optically determine the concentration of the analyte in the sample. In some cases, when the plate reader can transmit the concentration and notify, alter, etc., a user by displaying the concentration.

The present disclosure has described one or more preferred embodiments, and it should be appreciated that many equivalents, alternatives, variations, and modifications, aside from those expressly stated, are possible and within the scope of the invention.

It is to be understood that the disclosure is not limited in its application to the details of construction and the arrangement of components set forth in the accompanying description or illustrated in the accompanying drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

As used herein, unless otherwise limited or defined, discussion of particular directions is provided by example only, with regard to particular embodiments or relevant illustrations. For example, discussion of "top," "front," or "back" features is generally intended as a description only of the orientation of such features relative to a reference frame of a particular example or illustration. Correspondingly, for example, a "top" feature may sometimes be disposed below a "bottom" feature (and so on), in some arrangements or embodiments. Further, references to particular rotational or other movements (e.g., counterclockwise rotation) is generally intended as a description only of movement relative a reference frame of a particular example of illustration.

In some embodiments, aspects of the disclosure, including computerized implementations of methods according to the disclosure, can be implemented as a system, method, apparatus, or article of manufacture using standard programming or engineering techniques to produce software, firmware, hardware, or any combination thereof to control a processor device (e.g., a serial or parallel general purpose or specialized processor chip, a single- or multi-core chip, a microprocessor, a field programmable gate array, any variety of combinations of a control unit, arithmetic logic unit, and processor register, and so on), a computer (e.g., a processor device operatively coupled to a memory), or another electronically operated controller to implement aspects detailed herein. Accordingly, for example, embodiments of the disclosure can be implemented as a set of instructions, tangibly embodied on a non-transitory computer-readable media, such that a processor device can implement the instructions based upon reading the instructions from the computer-readable media. Some embodiments of the disclosure can include (or utilize) a control device such as an automation device, a special purpose or general-purpose computer including various computer hardware, software, firmware, and so on, consistent with the discussion below. As specific examples, a control device can include a processor, a microcontroller, a field-programmable gate array, a programmable logic controller, logic gates etc., and other typical components that are known in the art for implementation of appropriate functionality (e.g., memory, communication systems, power sources, user interfaces and other inputs, etc.).

The term "article of manufacture" as used herein is intended to encompass a computer program accessible from any computer-readable device, carrier (e.g., non-transitory signals), or media (e.g., non-transitory media). For example, computer-readable media can include but are not limited to magnetic storage devices (e.g., hard disk, floppy disk, magnetic strips, and so on), optical disks (e.g., compact disk (CD), digital versatile disk (DVD), and so on), smart cards, and flash memory devices (e.g., card, stick, and so on). Additionally it should be appreciated that a carrier wave can be employed to carry computer-readable electronic data such as those used in transmitting and receiving electronic mail or in accessing a network such as the Internet or a local area network (LAN). Those skilled in the art will recognize that many modifications may be made to these configurations without departing from the scope or spirit of the claimed subject matter.

Certain operations of methods according to the disclosure, or of systems executing those methods, may be represented schematically in the figures or otherwise discussed herein. Unless otherwise specified or limited, representation in the figures of particular operations in particular spatial order may not necessarily require those operations to be executed in a particular sequence corresponding to the particular spatial order. Correspondingly, certain operations represented in the figures, or otherwise disclosed herein, can be executed in different orders than are expressly illustrated or described, as appropriate for particular embodiments of the disclosure. Further, in some embodiments, certain operations can be executed in parallel, including by dedicated parallel processing devices, or separate computing devices configured to interoperate as part of a large system.

As used herein in the context of computer implementation, unless otherwise specified or limited, the terms "component," "system," "module," and the like are intended to encompass part or all of computer-related systems that include hardware, software, a combination of hardware and software, or software in execution. For example, a component may be, but is not limited to being, a processor device, a process being executed (or executable) by a processor device, an object, an executable, a thread of execution, a computer program, or a computer. By way of illustration, both an application running on a computer and the computer can be a component. One or more components (or system, module, and so on) may reside within a process or thread of execution, may be localized on one computer, may be distributed between two or more computers or other processor devices, or may be included within another component (or system, module, and so on).

In some implementations, devices or systems disclosed herein can be utilized or installed using methods embodying aspects of the disclosure. Correspondingly, description herein of particular features, capabilities, or intended purposes of a device or system is generally intended to inherently include disclosure of a method of using such features for the intended purposes, a method of implementing such capabilities, and a method of installing disclosed (or otherwise known) components to support these purposes or capabilities. Similarly, unless otherwise indicated or limited, discussion herein of any method of manufacturing or using a particular device or system, including installing the device or system, is intended to inherently include disclosure, as embodiments of the disclosure, of the utilized features and implemented capabilities of such device or system.

As used herein, unless otherwise defined or limited, ordinal numbers are used herein for convenience of reference based generally on the order in which particular components are presented for the relevant part of the disclosure. In this regard, for example, designations such as "first," "second," etc., generally indicate only the order in which the relevant component is introduced for discussion and generally do not indicate or require a particular spatial arrangement, functional or structural primacy or order.

As used herein, unless otherwise defined or limited, directional terms are used for convenience of reference for discussion of particular figures or examples. For example, references to downward (or other) directions or top (or other) positions may be used to discuss aspects of a particular example or figure, but do not necessarily require similar orientation or geometry in all installations or configurations.

This discussion is presented to enable a person skilled in the art to make and use embodiments of the disclosure. Various modifications to the illustrated examples will be readily apparent to those skilled in the art, and the generic principles herein can be applied to other examples and applications without departing from the principles disclosed herein. Thus, embodiments of the disclosure are not intended to be limited to embodiments shown, but are to be accorded the widest scope consistent with the principles and features disclosed herein and the accompanying claims. The accompanying detailed description is to be read with reference to the figures, in which like elements in different figures have like reference numerals. The figures, which are not necessarily to scale, depict selected examples and are not intended to limit the scope of the disclosure. Skilled artisans will recognize the examples provided herein have many useful alternatives and fall within the scope of the disclosure.

Also as used herein, unless otherwise limited or defined, "or" indicates a non-exclusive list of components or operations that can be present in any variety of combinations, rather than an exclusive list of components that can be present only as alternatives to each other. For example, a list of "A, B, or C" indicates options of: A; B; C; A and B; A and C; B and C; and A, B, and C. Correspondingly, the term "or" as used herein is intended to indicate exclusive alternatives only when preceded by terms of exclusivity, such as "either," "one of," "only one of," or "exactly one of." Further, a list preceded by "one or more" (and variations thereon) and including "or" to separate listed elements indicates options of one or more of any or all of the listed elements. For example, the phrases "one or more of A, B, or C" and "at least one of A, B, or C" indicate options of: one or more A; one or more B; one or more C; one or more A and one or more B; one or more B and one or more C; one or more A and one or more C; and one or more of each of A, B, and C. Similarly, a list preceded by "a plurality of" (and variations thereon) and including "or" to separate listed elements indicates options of multiple instances of any or all of the listed elements. For example, the phrases "a plurality of A, B, or C" and "two or more of A, B, or C" indicate options of: A and B; B and C; A and C; and A, B, and C. In general, the term "or" as used herein only indicates exclusive alternatives (e.g. "one or the other but not both") when preceded by terms of exclusivity, such as "either," "one of," "only one of," or "exactly one of."

Various features and advantages of the disclosure are set forth in the following claims.

What is claimed is:

1. A dispensing system comprising:

a container including multiple channels, each of the multiple channels are capable of containing an amount of a liquid;

a well plate including multiple wells, each respective well of the multiple wells being configured to align with a respective one of the multiple channels of the container;

a plunger including multiple protrusions, each respective protrusion of the multiple protrusions being configured to be inserted into a respective one of the multiple channels of the container, wherein the plunger is configured to move toward the container and forces each protrusion to be inserted into a respective one of the multiple channels of the container thereby driving liquid from the respective one of the multiple channels into the respective well of the well plate, wherein each channel is loaded with a respective amount of the liquid, a first barrier coupled to an upper surface of the container, the first barrier extending across a first opening of each channel of the multiple channels of the container to retain the liquid within each channel of the multiple channels, and a second barrier coupled to a lower surface of the container, the second barrier extending across a second opening of each channel of the multiple channels to retain the liquid within each channel of the multiple channels, wherein the first barrier and the second barrier are breakable, and wherein each respective protrusion is configured to break the first barrier and the second barrier when the respective protrusion is inserted into the respective channel.

2. The dispensing system of claim 1, wherein the multiple channels include at least one of at least 24 channels, at least 48 channels, or at least 96 channels, wherein the multiple wells include at least one of at least 24 wells, at least 48 wells, or at least 96 wells, and wherein the multiple protrusions include at least one of at least 24 protrusions, at least 48 protrusions, or at least 96 protrusions.

3. The dispensing system of claim 1, wherein the multiple channels include an array of channels, wherein the multiple wells include an array of multiple wells, and wherein the multiple protrusions include an array of multiple protrusions.

4. The dispensing system of claim 3, wherein each channel of the multiple channels contains a different amount of the liquid.

5. The dispensing system of claim 1, wherein the container includes a chamber, and wherein the well plate is configured to be inserted into the chamber to align the well plate relative to the container thereby aligning each well of the well plate with a respective one of the multiple channels of the container.

6. The dispensing system of claim 5, wherein when the well plate is inserted into the chamber, each well of the well plate aligns with two respective channels of the multiple channels.

7. The dispensing system of claim 1, wherein each channel extends entirely through the container to define the first opening in the container and the second opening in the container, and wherein the liquid within each channel of the multiple channels is retained within the channel and is prevented from flowing out of the channel by a surface tension of the liquid that interacts with the second opening.

8. The dispensing system of claim 1, wherein the first barrier or the second barrier is at least one of a membrane, or an adhesive layer with a backing material.

9. The dispensing system of claim 1, wherein the first barrier extends entirely across each of the multiple channels of the container, and wherein the second barrier extends entirely across each of the multiple channels of the container.

10. The dispensing system of claim 1, further comprising:

a spring coupled between the container and the plunger, the spring configured to bias the plunger to move towards the container; and a lock configured to, with the spring biased, block relative movement between the plunger and the container.

11. The dispensing system of claim 10, wherein the lock is a spacer that is positioned between a lower surface of the plunger and an upper surface of the container, and wherein the plunger contacts the spacer to block movement of the plunger towards the container.

12. A dispensing system comprising:

a container including a first channel that contains a first liquid;

a well plate including a first well, the first well configured to align with the first channel of the container; and a first plunger including a hole and a first protrusion that is configured to be inserted into the first channel of the container, wherein the first plunger further includes a second channel containing a second liquid, a second plunger having a second protrusion, the first liquid is positioned within the first channel of the container without moving the first plunger to draw the first liquid into the first channel, and wherein the first plunger is configured to move toward the container and advance the first protrusion into the first channel of the container thereby driving the first liquid from the first channel into the first well of the well plate, and wherein the second plunger is configured to move toward the container and advance the second protrusion through the hole of the first plunger and into the second channel of the first plunger thereby driving the second liquid from the second channel into the first well of the well plate.

13. The dispensing system of claim 12, wherein the first liquid is a biological assay reagent, and wherein the second liquid is a second biological assay reagent.

14. The dispensing system of claim 12, wherein the container includes a chamber positioned below the channel, and wherein the well plate is configured to be inserted into the chamber to be supported by the chamber, and wherein when the well plate is inserted into the chamber, the well of the well plate aligns with the channel of the container.

15. A method for dispensing a fluid, the method comprising:

aligning a first protrusion of a plunger with a first channel of a container containing a first liquid;

aligning a second protrusion of the plunger with a second channel of the container containing a second liquid;

aligning a first well of a well plate with the first channel of the container;

aligning a second well of the well plate with the second channel of the container;

providing a first barrier at a first opening of the first channel of the container and a second barrier at a second opening of the first channel of the container, the first barrier and the second barrier retaining the first liquid within the first channel;

advancing the first protrusion through the first barrier and the second barrier of the first channel of the container to dispense the first liquid from the first channel into the first well of the well plate; and advancing the second protrusion into the second channel of the container to dispense the second liquid from the second channel into the second well of the well plate.

16. The method of claim 15, further comprising:

aligning a third protrusion of a second plunger with a third channel of at least one of a second container, the container, or the first plunger, the third channel including a third liquid;

aligning the first well of the well plate with the third channel; and advancing the third protrusion of the second plunger into the third channel to dispense the third liquid from the third channel into the second well of the well plate.

* * * * *